(12) United States Patent
Radivojevic et al.

(10) Patent No.: US 10,313,177 B2
(45) Date of Patent: *Jun. 4, 2019

(54) DATA LINEAGE SUMMARIZATION

(71) Applicant: Ab Initio Technology LLC, Lexington, MA (US)

(72) Inventors: Dusan Radivojevic, North Andover, MA (US); Anthony M. Yeracaris, Newton, MA (US); Joel Gould, Arlington, MA (US); Andrew Schon, Newton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/293,490

(22) Filed: Oct. 14, 2016

(65) Prior Publication Data

US 2017/0033971 A1 Feb. 2, 2017

Related U.S. Application Data

(63) Continuation of application No. 14/805,616, filed on Jul. 22, 2015.

(Continued)

(51) Int. Cl.
G06F 15/173 (2006.01)
H04L 12/24 (2006.01)

(52) U.S. Cl.
CPC .......... H04L 41/0213 (2013.01); H04L 41/12 (2013.01); H04L 41/145 (2013.01); H04L 41/22 (2013.01)

(58) Field of Classification Search
CPC ..... H04L 41/0213; H04L 41/22; H04L 41/12; H04L 41/145
See application file for complete search history.

(56) References Cited

U.S. PATENT DOCUMENTS 5,966,072 A  10/1999 Stanfill
7,685,083 B2  3/2010 Fairweather
(Continued)

FOREIGN PATENT DOCUMENTS

JP  2002099561  4/2002
JP  2008027454  2/2008
(Continued)

OTHER PUBLICATIONS

U.S. Appl. No. 15/040,082, filed Feb. 10, 2016, Filtering Data Lineage Diagrams.

(Continued)

*Primary Examiner* — Michael A Keller
(74) *Attorney, Agent, or Firm* — Occhiuti & Rohlicek LLP

(57) ABSTRACT

An identification of a directed graph is received that includes data transformation nodes that represent computations that transform data elements and one or more data nodes that represent data elements, and includes directed links that represent lineage relationships; and computing summary information based on paths in the directed graph, and storing the summary information in one or more summary objects. The computing includes: receiving designation of interest for a plurality of the nodes of the directed graph; and generating one or more summary objects for remaining nodes not included in the plurality of nodes of interest, a first summary object including summary information based on a first path between a first node of interest and a second node of interest that does include one or more of the remaining nodes and does not include any nodes of interest other than the first and second nodes.

68 Claims, 18 Drawing Sheets

Related U.S. Application Data

(60) Provisional application No. 62/114,684, filed on Feb. 11, 2015, provisional application No. 62/028,485, filed on Jul. 24, 2014.

(56) References Cited

U.S. PATENT DOCUMENTS

| | | |
|---|---|---|
| 7,734,619 B2 | 6/2010 | Vierich et al. |
| 8,775,476 B2 | 7/2014 | Henderson |
| 9,063,998 B2 | 6/2015 | Kozina et al. |
| 9,256,656 B2 | 2/2016 | Fankhauser et al. |
| 9,430,583 B1 | 8/2016 | Flake |
| 9,563,411 B2* | 2/2017 | Roberts .................. G06F 8/433 |
| 9,753,926 B2 | 9/2017 | Flake et al. |
| 2004/0010752 A1 | 1/2004 | Chan et al. |
| 2007/0011668 A1 | 1/2007 | Wholey et al. |
| 2007/0061353 A1 | 3/2007 | Bobbin et al. |
| 2008/0183378 A1* | 7/2008 | Weidner ................. G01C 21/20 |
| | | 701/533 |
| 2009/0216728 A1 | 8/2009 | Brainerd et al. |
| 2010/0138420 A1 | 6/2010 | Bator et al. |
| 2010/0138431 A1 | 6/2010 | Bator et al. |
| 2011/0320460 A1 | 12/2011 | Fankhauser et al. |
| 2012/0179726 A1 | 7/2012 | Roberts |
| 2012/0259793 A1* | 10/2012 | Umansky ............... G06Q 10/06 |
| | | 705/348 |
| 2012/0271867 A1* | 10/2012 | Grossman ........... G06F 17/2288 |
| | | 707/821 |
| 2013/0091133 A1 | 4/2013 | Hashimoto et al. |
| 2014/0019423 A1 | 1/2014 | Liensberger et al. |
| 2014/0280362 A1 | 9/2014 | Henderson |
| 2015/0012314 A1 | 1/2015 | Mohammad et al. |
| 2015/0058278 A1* | 2/2015 | Fankhauser ....... G06F 17/30563 |
| | | 707/602 |
| 2015/0081701 A1 | 3/2015 | Lerios et al. |
| 2016/0028580 A1 | 1/2016 | Radivojevic et al. |
| 2016/0232229 A1 | 8/2016 | Radivojevic |
| 2016/0232230 A1 | 8/2016 | Radivojevic |
| 2016/0301709 A1* | 10/2016 | Hassanzadeh ...... H04L 63/1433 |
| 2016/0308712 A1* | 10/2016 | Azriel .................... H04L 67/16 |
| 2017/0033971 A1 | 2/2017 | Radivojevic et al. |
| 2017/0154087 A1* | 6/2017 | McClure ........... G06F 17/30572 |

FOREIGN PATENT DOCUMENTS

| | | |
|---|---|---|
| JP | 2012510689 | 5/2012 |
| JP | 2012221502 | 11/2012 |
| WO | 20140062278 | 4/2014 |

OTHER PUBLICATIONS

U.S. Appl. No. 15/040,162, filed Feb. 10, 2016, Filtering Data Lineage Diagrams.

Todd, Steve and Dan Hushon, "Scientific Lineage and Object-Based Storage Systems," 2009 5th IEEE International Conference on E-Science Workshops, Dec. 9, 2009 (pp. 52-58).

International Search Report and Written Opinion, International Application No. PCT/US2016/017246, dated Apr. 25, 2016 (12 pages).

International Search Report and Written Opinion, International Application No. PCT/US2016/017263, dated May 3, 2016 (12 pages).

BEA Systems Inc., "AquaLogic Data Services Platform (Administration Guide)," (146 pages) 2005.

Oracle, "Oracle Warehouse Builder Concepts, 11g Release 2 (11.2)", (154 pages) 2000.

Oracle, "Oracle Warehouse Builder Installation and Administration Guide, 11g Release 1 (11.1) for Windows and UNIX" (198 pages), 2000.

International Search Report and Written Opinion, PCT Application No. PCT/US15/41452, dated Oct. 19, 2015 (12 pages).

Anand, M. K. et al., "Exploring scientific workflow provenance using hybrid queries over nested data and lineage graphs", International Conference on Scientific and Statistical Database Management (SSDBM) 2009, pp. 237-254.

* cited by examiner

DATA LINEAGE SUMMARIZATION

CROSS-REFERENCE TO RELATED APPLICATIONS

This application is a continuation of U.S. application Ser. No. 14/805,616, filed on Jul. 22, 2015, which claims priority to U.S. Application Ser. No. 62/028,485, filed on Jul. 24, 2014, and to U.S. Application Ser. No. 62/114,684, filed on Feb. 11, 2015, each of which is incorporated herein by reference.

BACKGROUND

This description relates to summarization in data lineage diagrams.

In data processing systems it is often desirable for certain types of users to have access to a visual representation of a lineage of data as it passes through the systems. Such "data lineage diagrams" can include graphical representations of data and entities in the system for processing that data and dependency relationships among them. Very generally, among a number of uses, such data lineage diagrams can be used to reduce risk, verify regulatory compliance obligations, streamline business processes, and safeguard data. It is important that data lineage diagrams are both correct and complete.

Some systems capable of generating and displaying data lineage diagrams are able to automatically present an end-to-end data lineage diagram showing representations of data items and the items representing processing entities that consume or generate those data items. A path upstream from a particular item is sometimes called a "dependency analysis" for that item, and a path downstream from a particular item is sometimes called an "impact analysis" for that item. As used herein, a "data lineage diagram" may include an upstream dependency analysis and/or a downstream impact analysis relative to any given item. Some systems capable of generating and displaying data lineage diagrams allow users to collapse logical and/or physical groups of items in a data lineage diagram into a single element. Some systems capable of generating and displaying data lineage diagrams are able to enhance data lineage diagrams with enriched data information such as data quality scoring.

SUMMARY

In one aspect, in general, a method for managing lineage information in a computing system includes: receiving, over an input device or port, an identification of a directed graph that includes one or more data transformation nodes that represent computations that transform data elements and one or more data nodes that represent data elements, and includes directed links that represent respective lineage relationships between a computation and a data element to be received or produced by the computation during execution of the computation; and computing, using at least one processor, summary information based on paths in the directed graph, and storing the summary information in one or more summary objects, the computing including receiving designation of interest for a plurality of the nodes of the directed graph; and generating one or more summary objects for remaining nodes not included in the plurality of nodes of interest, a first summary object of the one or more summary objects including summary information based on a first path between a first node of interest and a second node of interest that does include one or more of the remaining nodes and does not include any nodes of interest other than the first and second nodes.

Aspects can include one or more of the following features.

Generating the first summary object includes traversing the first path between the first node of interest and the second node of interest to identify one or more remaining nodes that are not designated as being of interest along the first path, and forming the summary information for the identified one or more remaining nodes.

The method further includes generating a data lineage diagram as a visual representation of at least portions of the directed graph, in which each node designated as being of interest is represented by its own icon, and a plurality of the remaining nodes are represented by a common icon connected to a plurality of nodes of interest according to summary information stored in one or more of the summary objects.

The method further includes receiving a user input indicative of a user's desire to view details associated with the common icon and, in response to the user input, traversing the plurality of remaining nodes represented by the common icon and visually representing the remaining nodes in the data lineage diagram based on the traversal of paths of the directed graph including the plurality of remaining nodes associated with the summary information.

The method further includes receiving a designation of one of the one or more data transformation nodes or one of the one or more data nodes as a target node, wherein generating the data lineage diagram includes traversing one or more paths through the directed graph, each path of the one or more paths including two or more nodes of interest and the target node.

For at least some of the one or more paths through the directed graph, traversing the path includes traversing a first portion of the path in an upstream direction from the target node and traversing a second portion of the path in a downstream direction from the target node.

Traversing the first portion of the path includes determining whether the target node is marked as being a node of interest, and if the target node is determined to be a node of interest, traversing a link corresponding to a summary object associated with the target node from the target node to a first upstream node of interest, otherwise if the target node is not determined to be a node of interest, traversing an original path of the directed graph between the target node and the first upstream node of interest, including traversing one or more data transformation nodes or data nodes that are not designated as being of interest.

Traversing the first portion of the path further includes traversing a link corresponding to a summary object associated with the first upstream node of interest from the first upstream node of interest to a second upstream node of interest.

Traversing the second portion of the path includes determining whether the target node is marked as being a node of interest, and if the target node is determined to be a node of interest, traversing a link corresponding to a summary object associated with the target node from the target node to a first downstream node of interest, otherwise if the target node is not determined to be a node of interest, traversing an original path of the directed graph between the target node and the first downstream node of interest, including traversing one or more data transformation nodes or data nodes that are not designated as being of interest.

Traversing the second portion of the path further includes traversing a link corresponding to a summary object associated with the first downstream node of interest from the first downstream node of interest to a second downstream node of interest.

The one or more summary objects includes two or more summary objects, generating the linage diagram further includes merging at least some of the two or more summary objects into a summary node represented by the common icon.

Merging at least some of the two or more summary objects into the summary node includes analyzing relationships between the nodes of interest linked by the at least some of the two or more summary objects to determine whether merging the at least some of the two or more summary objects is possible.

Analyzing relationships between the nodes of interest includes determining that the at least some of the two or more summary objects are associated with a common downstream node of interest.

The designation of interest for at least some of the nodes is received from a user.

The designation of interest for at least some of the nodes is generated by the computing system.

The computing system generates the designation of interest for at least some of the nodes based on a position of the at least some of the nodes relative to a position of other nodes designated as being of interest.

The computing system generates the designation of interest for at least some of the nodes based on the at least some of the nodes sharing a data structure with other nodes designated as being of interest.

The computing system includes a plurality of separate, interconnected sub-systems, the portions of the directed graph being distributed among at least some of the sub-systems.

At least some of the sub-systems are represented by the common icon.

In another aspect, in general, software is stored in a non-transitory form on a computer-readable medium, for managing lineage information in a computing system, the software including instructions for causing a computing system to: receive, over an input device or port, an identification of a directed graph that includes one or more data transformation nodes that represent computations that transform data elements and one or more data nodes that represent data elements, and includes directed links that represent respective lineage relationships between a computation and a data element to be received or produced by the computation during execution of the computation; and compute, using at least one processor, summary information based on paths in the directed graph, and storing the summary information in one or more summary objects, the computing including receiving designation of interest for a plurality of the nodes of the directed graph; and generating one or more summary objects for remaining nodes not included in the plurality of nodes of interest, first summary object of the one or more summary objects including summary information based on a first path between a first node of interest and a second node of interest that does include one or more of the remaining nodes and does not include any nodes of interest other than the first and second nodes.

In another aspect, in general, a computing system for managing lineage information in a computing system includes: an input device or port for receiving an identification of a directed graph that includes one or more data transformation nodes that represent computations that transform data elements and one or more data nodes that represent data elements, and includes directed links that represent respective lineage relationships between a computation and a data element to be received or produced by the computation during execution of the computation; and at least one processor for computing summary information based on paths in the directed graph, and storing the summary information in one or more summary objects, the computing including receiving designation of interest for a plurality of the nodes of the directed graph; and generating one or more summary objects for remaining nodes not included in the plurality of nodes of interest, a first summary object of the one or more summary objects including summary information based on a first path between a first node of interest and a second node of interest that does include one or more of the remaining nodes and does not include any nodes of interest other than the first and second nodes.

In another aspect, in general, a computing system for managing lineage information in a computing system including: means for receiving an identification of a directed graph that includes one or more data transformation nodes that represent computations that transform data elements and one or more data nodes that represent data elements, and includes directed links that represent respective lineage relationships between a computation and a data element to be received or produced by the computation during execution of the computation; and means for computing, using at least one processor, summary information based on paths in the directed graph, and storing the summary information in one or more summary objects, the computing including receiving designation of interest for a plurality of the nodes of the directed graph; and generating one or more summary objects for remaining nodes not included in the plurality of nodes of interest, a first summary object of the one or more summary objects including summary information based on a first path between a first node of interest and a second node of interest that does include one or more of the remaining nodes and does not include any nodes of interest other than the first and second nodes.

Aspects can include one or more of the following advantages.

As the complexity of data processing systems has increased, data lineage diagrams have also become increasingly complex, presenting many data lineage nodes (e.g., data nodes and data transformation nodes), represented by respective icons, in a single view. As the number of data nodes presented to a user in a data lineage diagram increases, the data lineage diagram may become difficult to understand.

The approaches described herein leverage a realization that, within a given data processing system, specific data nodes are usually of particular interest to a user. For example, one type of data node that is of particular interest to a user may be any data nodes in a lineage that are known to store a certain type of information (e.g., personally identifiable information).

In the approaches described herein, sets of data lineage nodes that are not of interest to the user and share a relevant topology with one another are collapsed into a summary node represented by a single icon in the data lineage diagram. The remaining nodes in the data lineage diagram that are not included in a summary node are of "high interest" to the user (i.e., nodes designated as being "of interest" as opposed to other nodes that are not designated as being "of interest"). The result is a summarized data lineage diagram that shows only the details that have been designated to be of interest to the user (or an intended audience), with any omitted details indicated by summary nodes in the summarized data lineage diagram.

In one aspect, in general, a data lineage diagram generation system is configured to summarize parts of the data lineage diagrams that it displays. A data lineage diagram is an on-screen representation of a corresponding "data lineage graph" that has a particular topology and is stored in one or more data structures accessible to the system. An "augmented data lineage graph" that has been augmented to store summary information in the form of "summary objects" (describe in more detail below) is generated after the system receives a designation of high interest nodes in the data lineage graph. The system uses the augmented data lineage graph to generate a summarized data lineage diagram for display. The summarized data lineage diagrams generated by the system show only high interest portions of the data lineage diagram and summarize low interest portions of the data lineage diagram, thereby reducing a complexity of the data lineage diagram.

Among other advantages, approaches highlight high interest data lineage nodes while suppressing low interest data lineage nodes, thereby providing a more understandable data lineage diagram. This may be particularly useful, for example, if the number of data lineage nodes that could potentially be displayed in a data lineage diagram is so large (e.g., thousands or millions) that they would visually obscure the locations of the relatively few data lineage nodes (e.g., tens or hundreds) that are actually of interest.

Since the described approaches display fewer data lineage nodes in data lineage diagrams, the data lineage diagrams generated by the described approaches are computed and displayed more quickly than the data lineage diagrams generated by previous approaches.

Other features and advantages of the invention will become apparent from the following description, and from the claims.

DESCRIPTION

Figure 1:
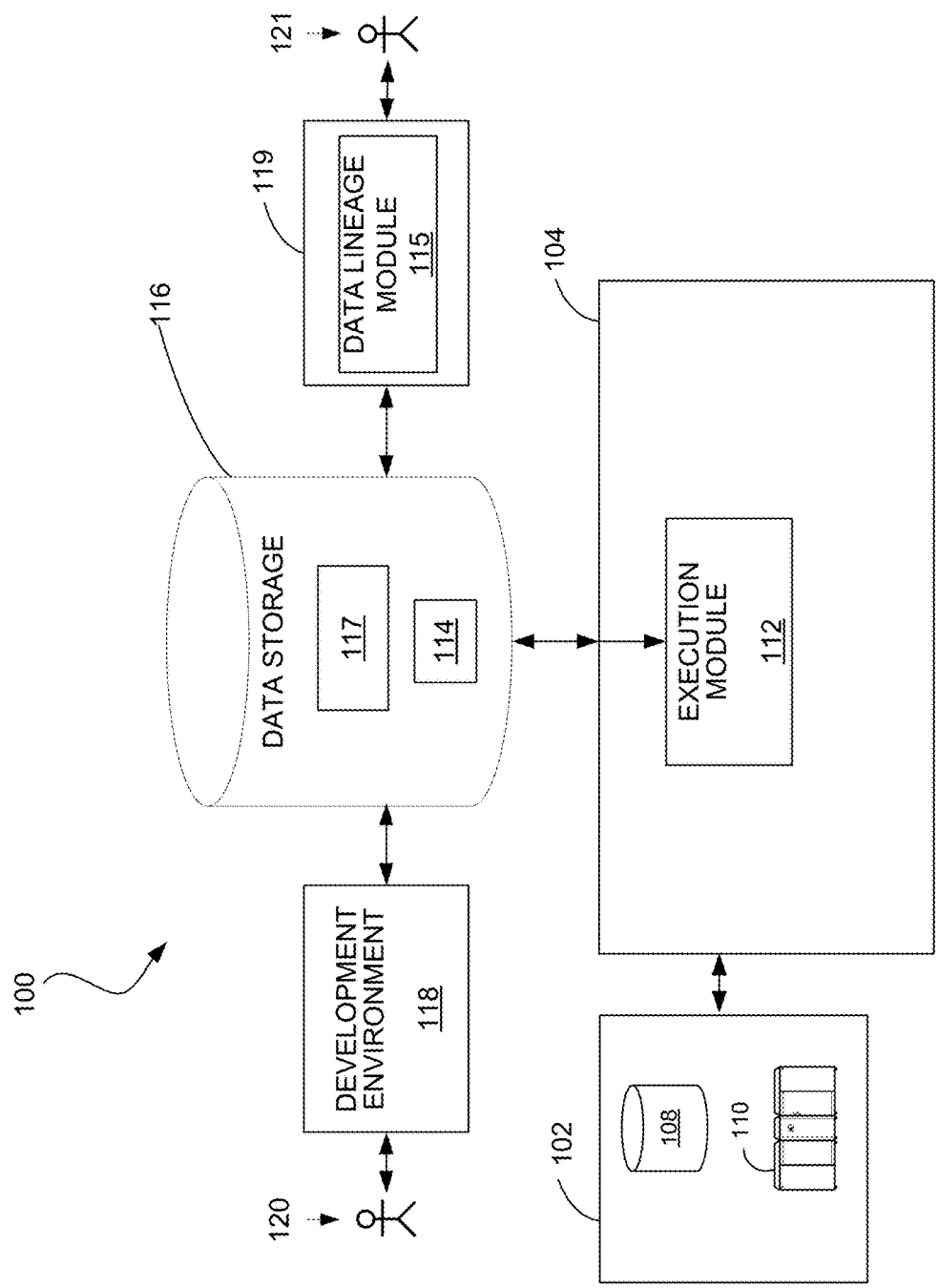
FIG. 1 is a block diagram of a computing system including a data lineage module.

FIG. 1 shows an example of a computing system 100 in which the data lineage summarization techniques can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes a data processing system 112. The execution environment 104 may be hosted, for example, on a data processing system 112 that includes one or more general-purpose computers under the control of a suitable operating system, such as a version of the UNIX operating system. For example, the data processing system 112 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The system 100 includes a development environment 118 in which a developer is able to specify a data processing computer program 117 (e.g., a dataflow graph) and store the program in a data storage system 116 accessible to the execution environment 104. The data processing system 112 processes data from the data source according to the computer program 117 to generate output data 114. The output data may be 114 stored back in the data source 102 or in the data storage system 116, or otherwise used. The development environment 118 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The system 100 includes an enterprise environment 119 through which a user 121 (e.g., an enterprise user or data architect) can request and view data lineage diagrams. To generate data lineage diagrams, the enterprise environment 119 includes a data lineage module 115, which is able to analyze system metadata 120 including metadata that characterizes data transformation nodes representing computations corresponding to different portions of the computer program 117 (e.g., different dataflow graphs or different components within a dataflow graph) and metadata that characterizes data nodes accessed or generated by the computer program 117 (e.g., datasets from the data source 102 or datasets corresponding to the output data 114) to generate data lineage diagrams. In some cases, the data lineage module 115 is also able to analyze the computer program 117 and stored data directly if, for example, metadata is not available or incomplete. In some implementations, the system 100 includes a separate storage system for such metadata.

Figure 2:
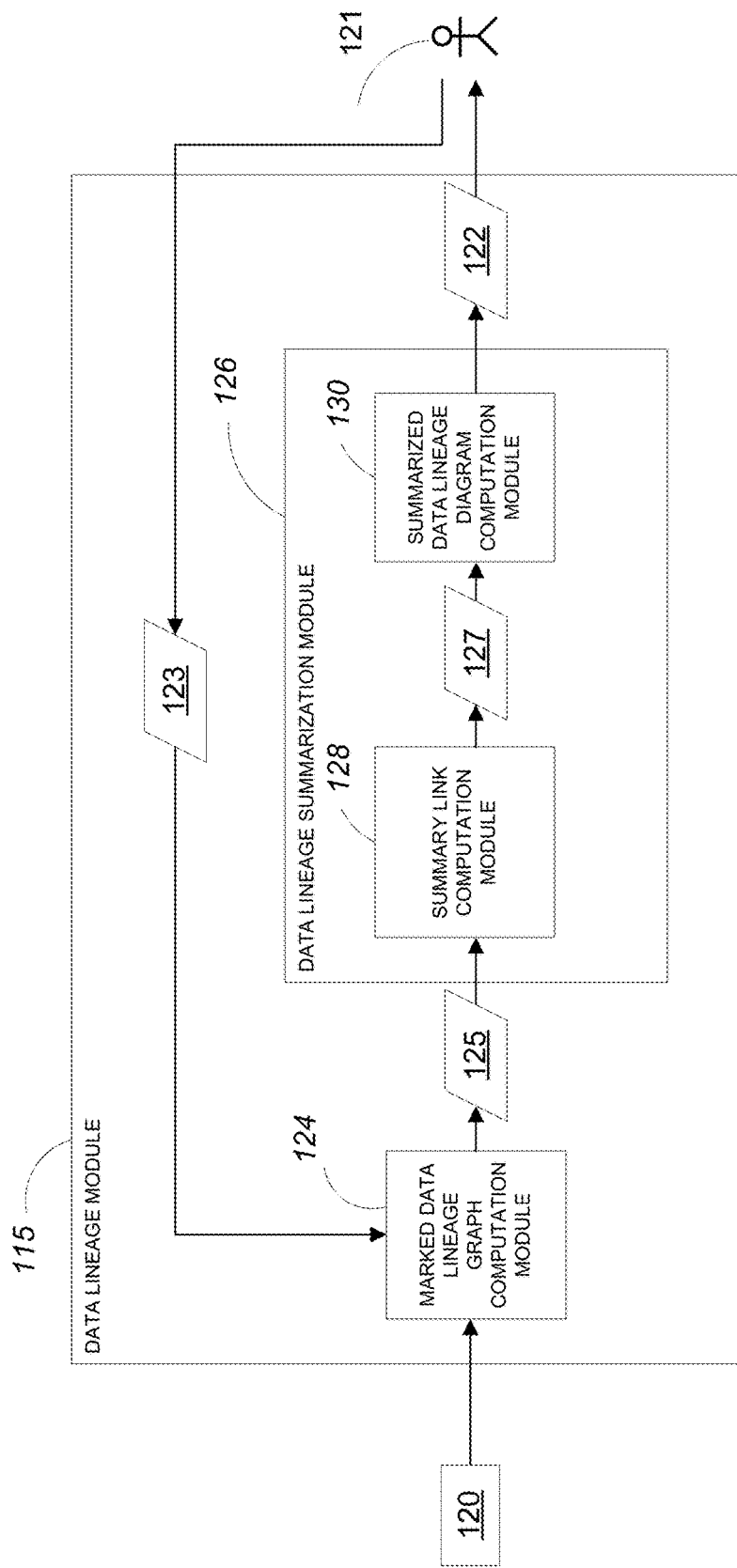
FIG. 2 is a data lineage module.

Referring to FIG. 2, the data lineage module 115 receives system metadata 120 and one or more commands 123 from the user 121 as input and generates a summarized data lineage diagram 122 for presentation to the user 121 as output. The data lineage module 115 includes a marked data lineage graph computation module 124 and a data lineage summarization module 126. The data lineage summarization module 126 includes a summary link computation module 128 and a summarized data lineage diagram computation module 130.

In operation, the system metadata 120 received by the data lineage module 115 is provided to the marked data lineage graph computation module 124 along with the commands 123 from the user 121. At least some of the commands 123 from the user 121 include an indication of a target data node for data lineage analysis and, in some examples an indication of one or more data nodes of high interest. Very generally, the term "data node" as it is used in some examples herein relates to a dataset (e.g., a database) and/or a specific field in a dataset. In some examples, data nodes marked as being of high interest are generally of interest to more than one user of the enterprise system 119 while data nodes marked as target data nodes are of particular interest to a given user of the enterprise system 119 at a given time.

The marked data lineage graph computation module 124 processes the system metadata 120 according to the commands from the user 121 to generate a marked data lineage graph 125. Very generally, the marked data lineage graph 125 includes one or more data nodes interconnected with one or more transformation nodes by links, which represent a dependency relationship between the nodes. The data nodes that the user 121 indicated as being target data nodes or data nodes of high interest are marked as such in the marked data lineage graph 125 (e.g., with a bull's-eye symbol).

The marked data lineage graph 125 is provided to the data lineage summarization module 126 where it is first provided to the summary link computation module 128. As is described in greater detail below, the summary link computation module 128 generates a number of summary links between the nodes that the user 121 has marked as being of high interest. The information characterizing a summary link is stored in a summary object. Each summary link represents a path of data dependency between two high interest data nodes but omits any data transformation nodes or data nodes of low interest that exist on along the path. The summary link computation module 128 generates an augmented data lineage graph 127 as output by storing the summary objects characterizing the computed summary links within the data structure(s) that store the marked data lineage graph 125.

The augmented data lineage graph 127 is provided to the summarized data lineage diagram computation module 130. As is described in greater detail below, the summarized link computation module 130 processes the augmented data lineage graph 127 to generate the summarized data lineage diagram 122. To do so, the summarized data lineage diagram computation module 130 groups nodes indicated as being of low interest into "summary nodes" (based on processing summary links in the augmented data lineage graph 127) while displaying nodes of high interest in full detail in the summarized data lineage diagram 122. The resulting summarized data lineage diagram 122 is passed out of the data lineage module 115 and provided to the user 121.

Figure 3:
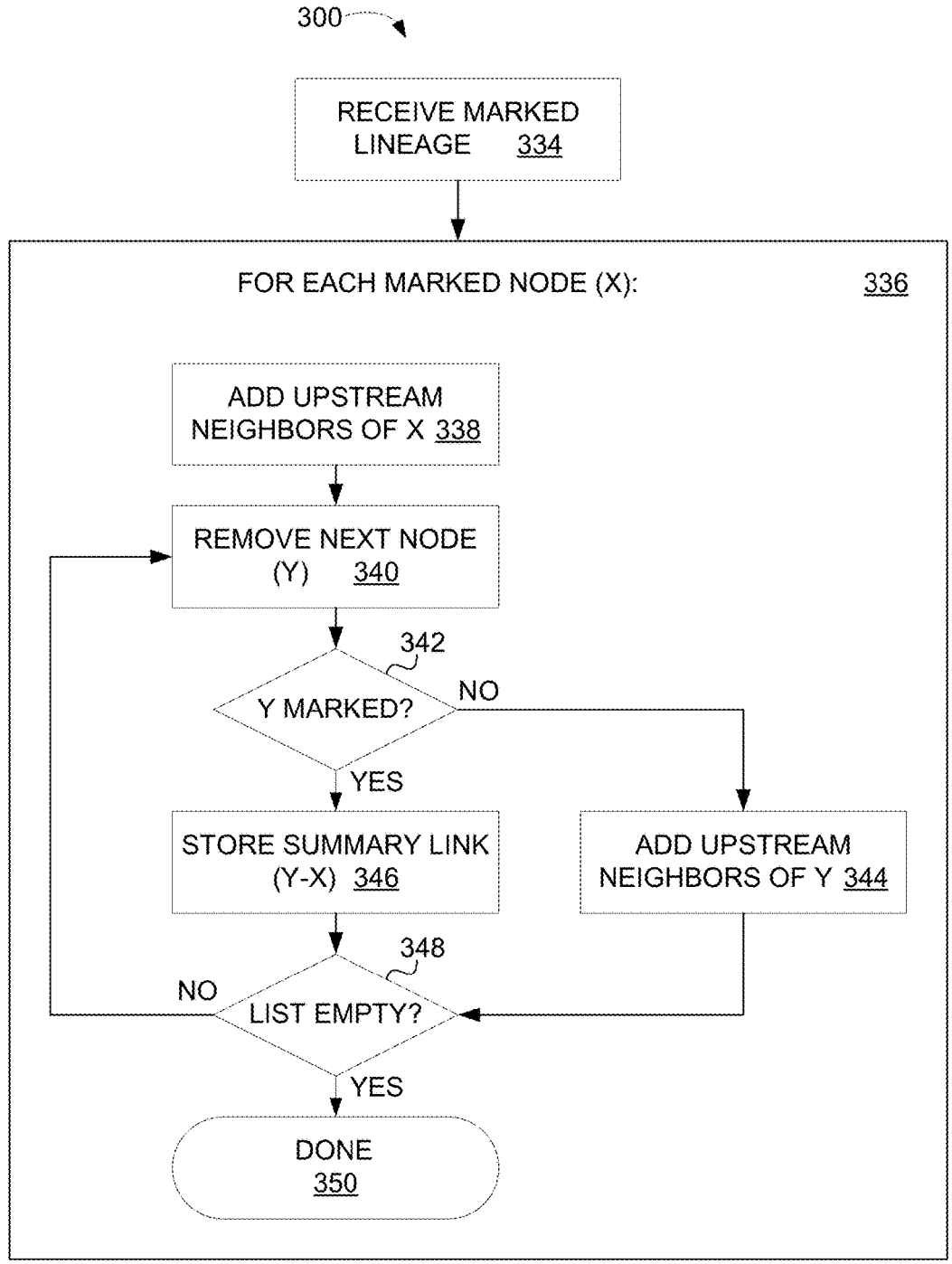
FIG. 3 is a flow chart of a summary link computation method.

Referring to FIG. 3, a flow chart 300 illustrates the steps followed by the summary link computation module 128 of FIG. 2 to generate the augmented data lineage graph 127. In a first step 334, the marked data lineage graph 125 is received. The marked data lineage graph 125 is provided to a processing loop 336 which operates on each data node in the marked data lineage graph 125 that is marked as being of high interest.

For each data node marked as being of high interest (designated as node 'X'), all of its upstream neighbors (i.e., data nodes that feed data to the high interest data node) are added to the bottom of a list of data nodes at step 338. The data node at the top of the list of data nodes is then removed from the list at step 340 and designated as data node 'Y.' At step 342, a test determines whether data node Y is marked as being of high interest. If data node Y is not marked as being of high interest, then all of data node Y's upstream neighbors are added to the bottom of the list of data nodes at step 344. Otherwise, if data node Y is marked as being of high interest, then a summary link between data node Y and data node X is stored at step 346. As is noted above, the summary link summarizes a particular path of data dependency between data node Y and data node X by omitting any non-high interest nodes (both data nodes and transformation nodes) along the path.

After either storing the summary link at step 346 or adding data node Y's upstream neighbors at step 344, a test is performed at step 348 to determine whether the list of data nodes is empty. If the list is not empty then the process loops back to step 340, removing the next data node from the top of the list of data nodes, designating the new data node as 'Y,' and repeating the above-described steps. Otherwise, if the list of data nodes is empty, then the process finishes at 350 and the process for generating the augmented data lineage graph 127 is complete.

Figure 4:
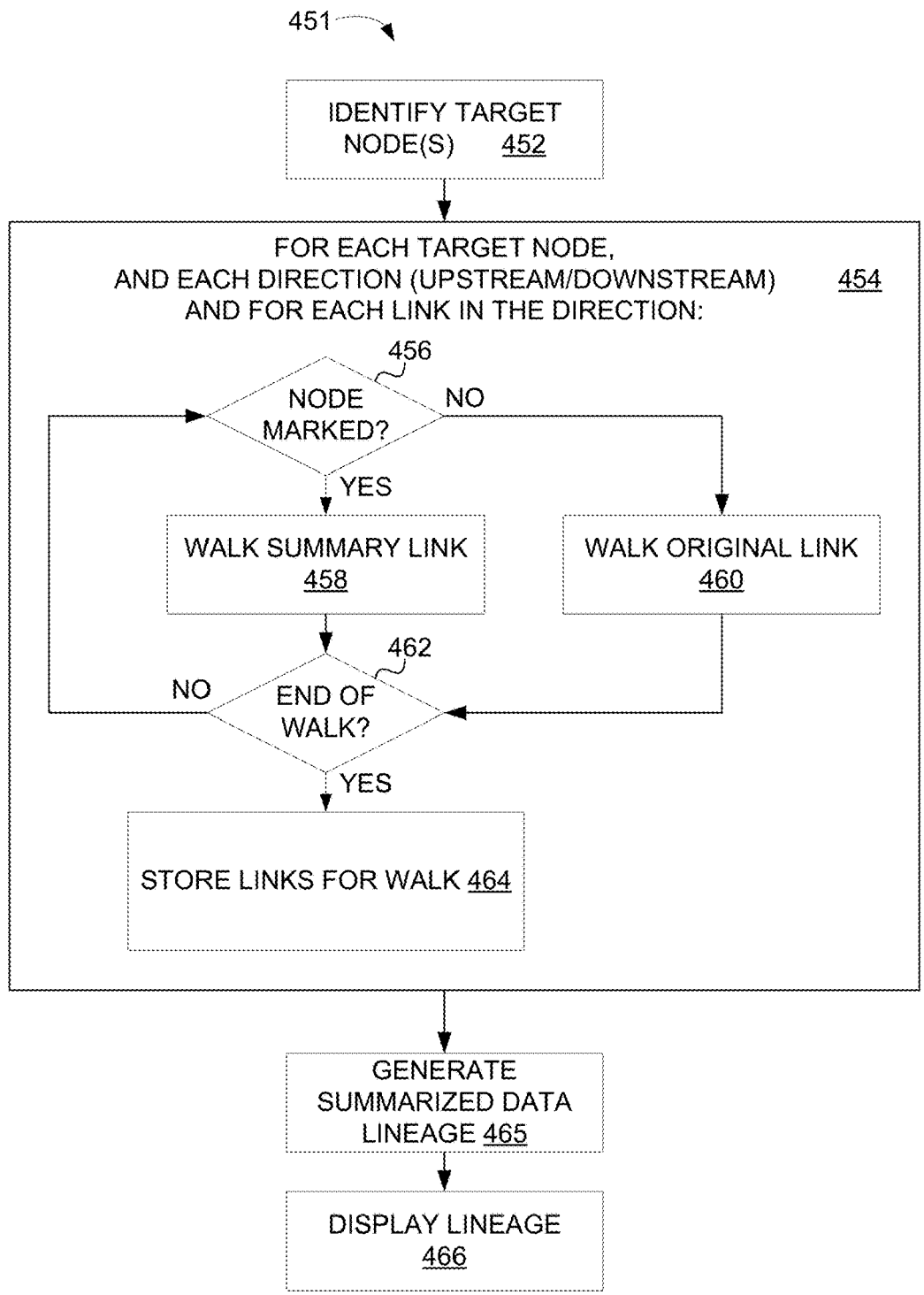
FIG. 4 is a flow chart of a summarized data lineage computation method.

Referring to FIG. 4, a flow chart 451 illustrates a process followed by the summarized data lineage diagram computation module 130 of FIG. 2 for generating the summarized data lineage diagram 122. In a first step 452, the target data nodes in the augmented data lineage graph 127 are identified. The identified target data nodes are then provided to a processing loop 454, which executes for each identified target data node in both an upstream direction and a downstream direction. Very generally, each iteration of the processing loop 454 traverses (i.e., walks) a path from the target data node to a data node at an edge of the augmented data lineage graph 127. Traversing a path (or "walking" a path) between nodes includes examining each node along the path to identify any nodes along that path that have certain properties.

Within the processing loop 454 a test is performed at step 456 to determine whether the target data node is marked as being of high interest. If the data node is marked as being of high interest, then the algorithm walks a summary link connected to the target data node to the next data node at step 458. If the data node is not marked as being of high interest then the algorithm walks the original link (i.e., the non-summary link) to the next data node at step 460.

At step 462 a test is performed to determine if the algorithm has reached the end of its walk for the target data node. If so, the links associated with the walk for the target data node are stored at step 464 for later use by a summarized data lineage diagram generation step 465. If the algorithm has not reached the end of its walk for the target data node, then the algorithm returns to step 456 where the above-described process is repeated for the next data node along the current walk from the target data node. As is noted above, the process described above is repeated in both an upstream and a downstream direction from the target data node.

After all of the identified target data nodes are processed by the processing loop 454, the output of the processing loop 454 is provided to the summarized data lineage diagram generation step 465. In general, the summarized data lineage diagram generation step collapses summary links in the output of the processing loop into summary nodes to generate the summarized data lineage diagram 122. The process for collapsing summary links into summary nodes is described in greater detail in the examples presented below.

The summarized data lineage diagram 122 generated by the summarized data lineage diagram generation step 465 is displayed to the user 121 at step 466.

1. Example 1

Figure 5:
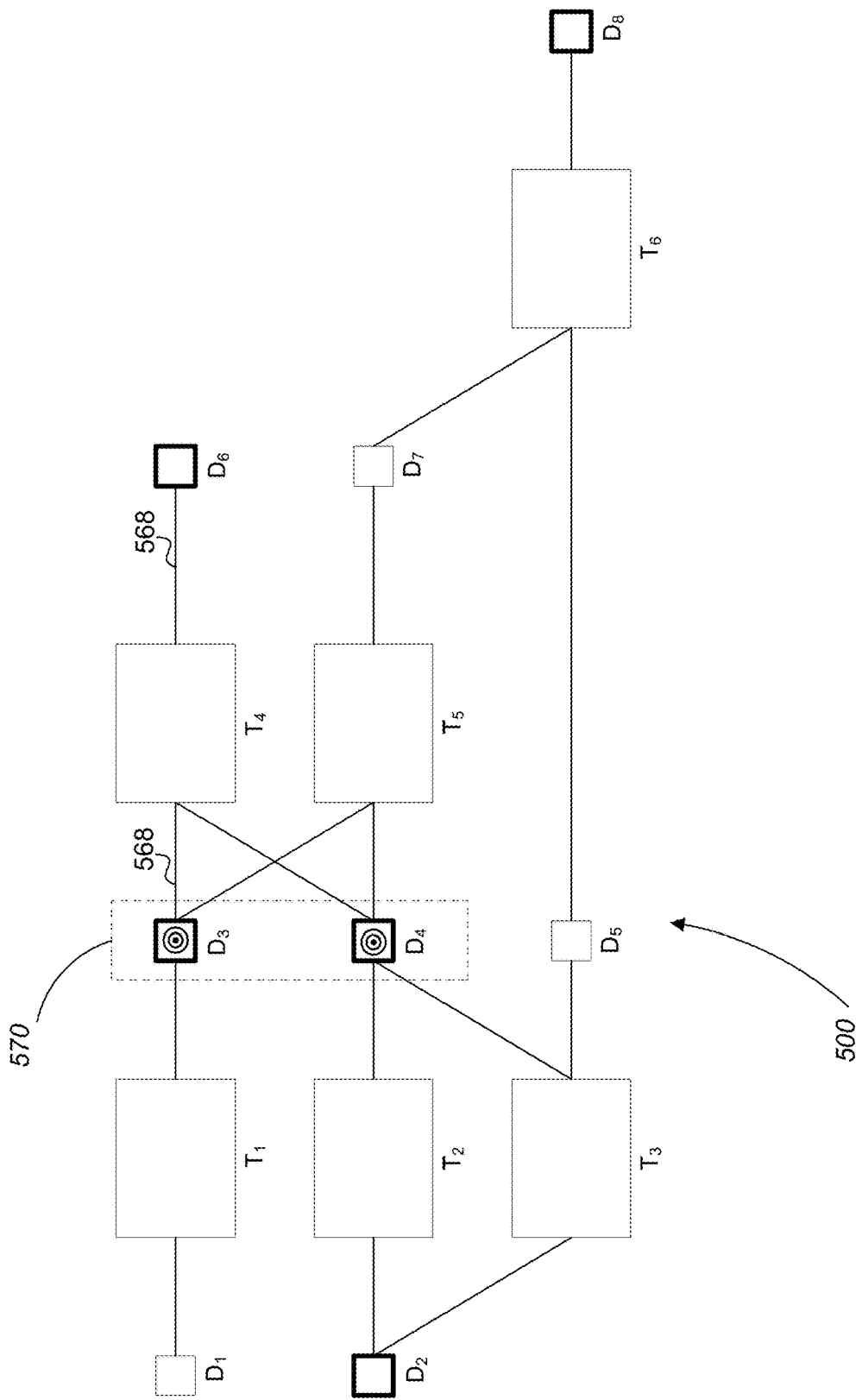
FIG. 5 is a first exemplary marked data lineage graph.

Referring to FIG. 5, one example of a marked data lineage graph 500 includes a number of data nodes $D_1$-$D_8$ and a number of data transformation nodes $T_1$-$T_6$. The data nodes and the data transformation nodes are interconnected by links 568 representing a data dependency between the nodes. In general, the links 568 are directed in the sense that data flows in a direction from the left side of the page to the right side of the page. In the marked data lineage graph 500, certain data nodes (i.e., $D_2$, $D_3$, $D_4$, $D_6$, and $D_8$) are marked as being of high interest and two of the data nodes (i.e., $D_3$ and $D_4$) are marked as being target data nodes. Both of the target data nodes $D_3$ and $D_4$ are located in a container 570. In general, a container is a structure that represents the boundary of a system or subsystem in the computer program. Some, all, or none of the nodes in a given container may be of high interest to the user 121.

Figure 6:
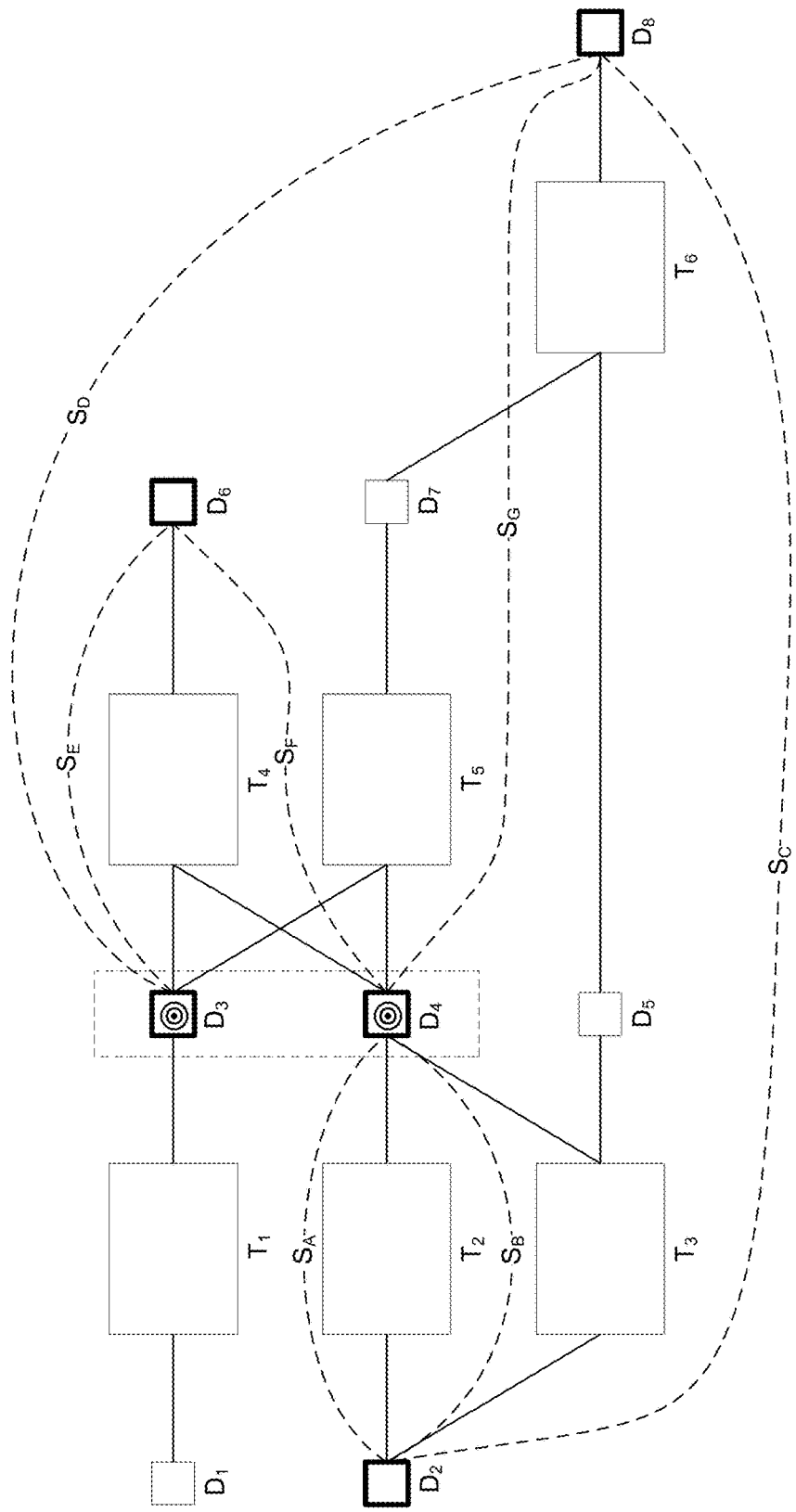
FIG. 6 is a first exemplary augmented data lineage graph including summary links generated by the summary link computation method.

Referring to both FIG. 3 and FIG. 6, when the marked data lineage graph 500 is provided to the summary link computation module 128 of FIG. 2, the procedure shown in FIG. 3 is applied to the marked data lineage graph to generate summary links $S_A$-$S_G$. For the sake of brevity, the application of the procedure of FIG. 3 is only described for one of the high interest data nodes (i.e., $D_8$) in the marked data lineage graph 500. However, it should be appreciated that the procedure is performed for each of the data nodes of high interest in the marked data lineage graph 500.

For high interest data node $D_8$, data node $D_8$ is first designated as 'X.' At step 338, the upstream neighbors of X, $D_7$ and $D_8$, are added to a list of data nodes. At step 340, $D_7$ is removed from the list and is designated as 'Y.' At step 342, a test is performed to determine whether Y is marked as being of high interest. The test returns the answer NO. Since the test returned NO, the procedure proceeds to step 344 where the upstream neighbors of Y, $D_3$ and $D_4$ are added to the bottom of the list of data nodes. At step 348 a test is performed to determine whether the list of data nodes is empty. The test returns the answer NO.

Since the test returned NO, the procedure loops back to step 340 where $D_5$ is removed from the list of data nodes and is designated as 'Y.' At step 342, a test is performed to determine whether Y is marked as being of high interest. The test returns the answer 'NO.' Since the test returned NO, the procedure proceeds to step 344 where the upstream neighbor of Y, $D_2$ is added to the bottom of the list of data nodes. At step 348, a test is performed to determine whether the list of data nodes is empty. The test returns the answer NO.

Since the test returned NO, the procedure loops back to step 340 where $D_3$ is removed from the list and is designated as 'Y.' At step 342, a test is performed to determine whether Y is marked as being of high interest. The test returns the answer 'YES.' Since the test returned YES, the procedure proceeds to step 346 where a summary link ($S_D$) between Y ($D_3$) and X ($D_8$) is stored. At step 348, a test is performed to determine whether the list of data nodes is empty. The test returns the answer NO.

Since the test returned NO, the procedure loops back to step 340 where $D_4$ is removed from the list and is designated as 'Y.' At step 342, a test is performed to determine whether Y is marked of high interest. The test returns the answer 'YES.' Since the test returned YES, the procedure proceeds to step 346 where a summary link ($S_G$) between Y ($D_4$) and X ($D_8$) is stored. At step 348, a test is performed to determine whether the list of data nodes is empty. The test returns the answer 'NO.'

Since the test returned No, the procedure loops back to step 340 where $D_2$ is removed from the list and is designated as 'Y.' At step 342, a test is performed to determine whether Y is marked as being of high interest. The test returns the answer 'YES.' Since the test returned YES, the procedure proceeds to step 346 where a summary link (Sc) between Y ($D_2$) and X ($D_8$) is stored. At step 348, a test is performed to determine whether the list of data nodes is empty. The test returns the answer 'YES.'

With the list being empty, the procedure has finished computing the summary links for the $D_8$ data node, with the list of summary nodes for $D_8$ being: $S_D = D_8 \rightarrow D_3$, $S_G = D_8 \rightarrow D_4$, and $S_C = D_8 \rightarrow D_2$.

The summary link computation module 128 performs the above summary link computation procedure for all data nodes marked as being high interest in the marked data lineage graph 500.

Referring to FIG. 6, an augmented data lineage graph 127, including summary links, shows that the resulting list of summary links is $S_A = D_4 \rightarrow D_2$, $S_B = D_4 \rightarrow D_2$, $S_C = D_8 \rightarrow D_2$, $S_D \rightarrow D_8 \rightarrow D_3$, $S_E \rightarrow D_6 \rightarrow D_3$, $S_F \rightarrow D_6 \rightarrow D_4$, and $S_G \rightarrow D_8 \rightarrow D_4$.

Figure 7:
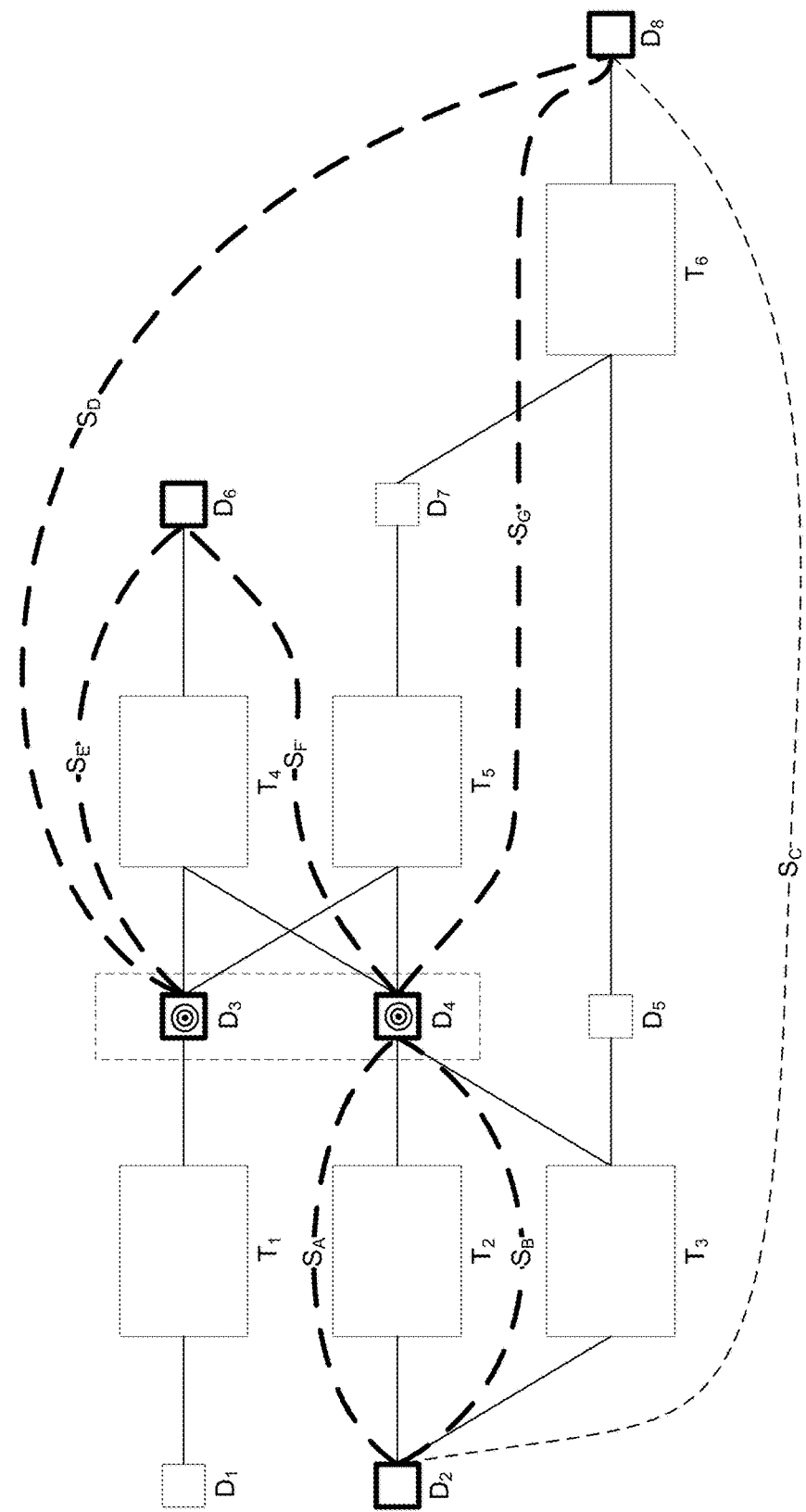
FIG. 7 is the first exemplary augmented data lineage graph after application of the method of FIG. 4.

Referring now to both FIG. 4 and FIG. 7, the augmented data lineage graph 127 is provided to the summarized data lineage diagram computation module 130 of FIG. 2 which applies the procedure shown in FIG. 4 to generate the summarized data lineage diagram 122. Initially, at step 452 of the procedure, the target data nodes in the augmented data lineage graph 127 are identified as data nodes $D_3$ and $D_4$. For each of $D_3$ and $D_4$, in both the upstream and downstream directions, the procedure in step 454 of FIG. 4 is performed. For the sake of brevity, the application of the procedure of FIG. 4 is only described for one of the target data nodes (i.e., $D_4$) in the augmented data lineage graph 127. However, it should be appreciated that the procedure is performed in both the upstream and downstream directions for each of the target data nodes in the augmented data lineage graph 127.

For target data node $D_4$, a test is performed at step 456 to determine whether $D_4$ is marked as being of high interest. The test returns an answer of "YES" since $D_4$ is marked as being of high interest. Since $D_4$ is marked as being of high interest, the procedure proceeds to step 458 where each of the summary links connected to $D_4$ (i.e., $S_A$, $S_B$, $S_F$, $S_G$) are 'walked.' In particular, in the downstream direction, there are two summary links $S_F$ and $S_G$. Summary link $S_F$ is walked to data node $D_6$ at step 458. At step 462 a test is performed to determine whether $D_6$ is at the edge of the augmented data lineage graph 127 (i.e., the end of the walk). The test returns an answer of 'YES' since $D_6$ is at the edge. Since the test returned an answer of YES, the walked link is stored for a use in a later summarized lineage generation step 465 at step 464. Similarly, summary link $S_G$ is walked to data node $D_8$ at step 458. At step 462, a test is performed to determine whether $D_8$ is at the edge of the augmented data lineage graph 127. The test returns an answer of 'YES' since $D_8$ is at the edge. Since the test returned an answer of YES, the walked link is stored for use in a later summarized lineage generations step 465 at step 464.

In the upstream direction, there are two summary links $S_A$ and $S_B$. Summary link $S_A$ is walked to data node $D_2$ at step 458. At step 462 a test is performed to determine whether $D_2$ is at the edge of the augmented data lineage graph 127 (i.e., the end of the walk). The test returns an answer of 'YES' since $D_2$ is at the edge. Since the test returned an answer of YES, the walked link is stored for a use in a later summarized lineage generation step 465 at step 464. Similarly, summary link $S_B$ is walked to data node $D_2$ at step 458. At step 462, a test is performed to determine whether $D_2$ is at the edge of the augmented data lineage graph 127. The test returns an answer of 'YES' since $D_2$ is at the edge. Since the test returned an answer of YES, the walked link is stored for use in a later summarized data lineage diagram generation step 465 at step 464.

The procedure of FIG. 4 is repeated for target data node $D_3$ resulting in summary link $S_E$ from $D_3$ to $D_6$ being walked and summary link from $S_D$ from $D_3$ to $D_8$ being walked. The walked links are stored for later use by the summarized lineage generation step 465. Referring to FIG. 7, the augmented data lineage graph 127 shows the summary links walked by the procedure of FIG. 4 shown in bold dashed lines.

The walked summary links stored by step 464 for target data nodes $D_3$ and $D_4$ are provided to step 465 which generates summary nodes from the stored summary links. The summary nodes are provided to a data lineage display step 466 which displays the summarized data lineage diagram 122 to the user.

Figure 8:
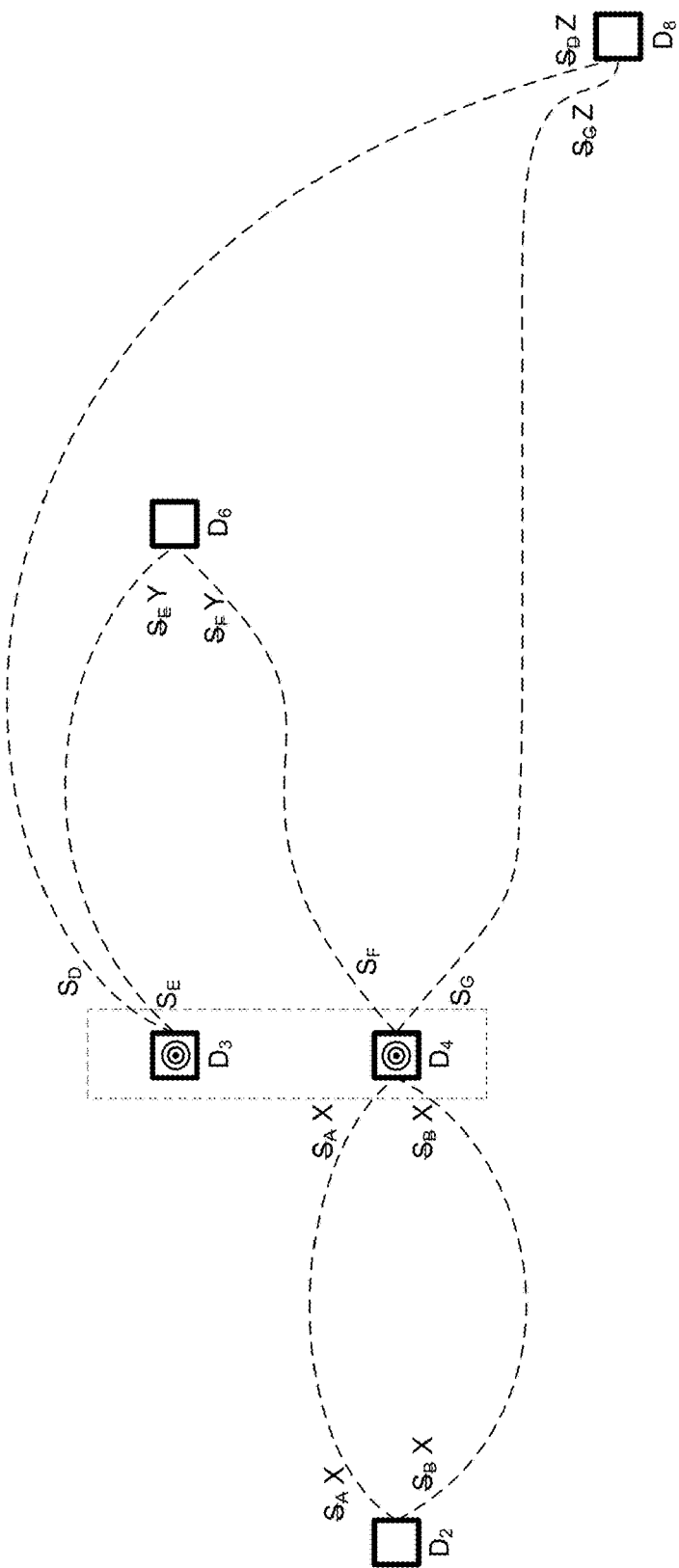
FIG. 8 illustrates a method for summary node generation for the first exemplary augmented data lineage graph.

Referring to FIG. 8, the summarized data lineage diagram generation step 465 receives the output of the procedure loop 454 of FIG. 4. The output of the procedure loop 454 includes the high interest data nodes from the marked data lineage graph, the target data nodes $D_3$ and $D_4$, and the links stored by step 464 of FIG. 4 which in this case happen to all be summary links. In some examples, for each summary link, the summarized data lineage diagram generation step 465 labels each end of the link (i.e., the rightmost end and the leftmost end) with the same label (e.g., the name of the summary link). In this example, summary link $S_A$ has its rightmost end labeled $S_A$ and its leftmost end labeled as $S_A$. Summary links $S_B$, $S_D$, $S_E$, $S_F$, and $S_G$ are labeled in the same way.

For each high interest data node, any summary link(s) having their rightmost ends connected to the high interest data node are identified. If the rightmost ends of more than one summary link are connected to the high interest data node, then the rightmost ends of each summary link connected to the high interest data node have their respective labels replaced with a summary node label. For example, the rightmost ends of summary links $S_A$ and $S_B$ are connected to high interest data node $D_4$. The labels for the rightmost ends of summary links $S_A$ and $S_B$ are both replaced with the summary node label 'X.' Similarly, the labels for the rightmost ends of summary links $S_E$ and $S_F$ are replaced with the summary node label and the labels for the rightmost ends of summary links $S_D$ and $S_G$ are replaced with the summary node label 'Z.'

For each high interest data node, any summary link(s) having their leftmost ends connected to the high interest data node are identified. For any set of two or more of the identified summary links which have the same summary node label for their rightmost ends, the labels for the leftmost ends of the summary links are replaced with the summary node label of the summary link's rightmost end. For example, summary link $S_A$ and summary link $S_B$ have their leftmost ends connected to high interest data node $D_2$. The labels for the rightmost ends of both $S_A$ and $S_B$ both assigned the summary node label 'X' (as is described above). Upon identifying this situation, the summarized data lineage diagram generation step 465 replaces the labels of the leftmost ends of summary link $S_A$ and summary link $S_B$ with the summary node label 'X.'

Figure 9:
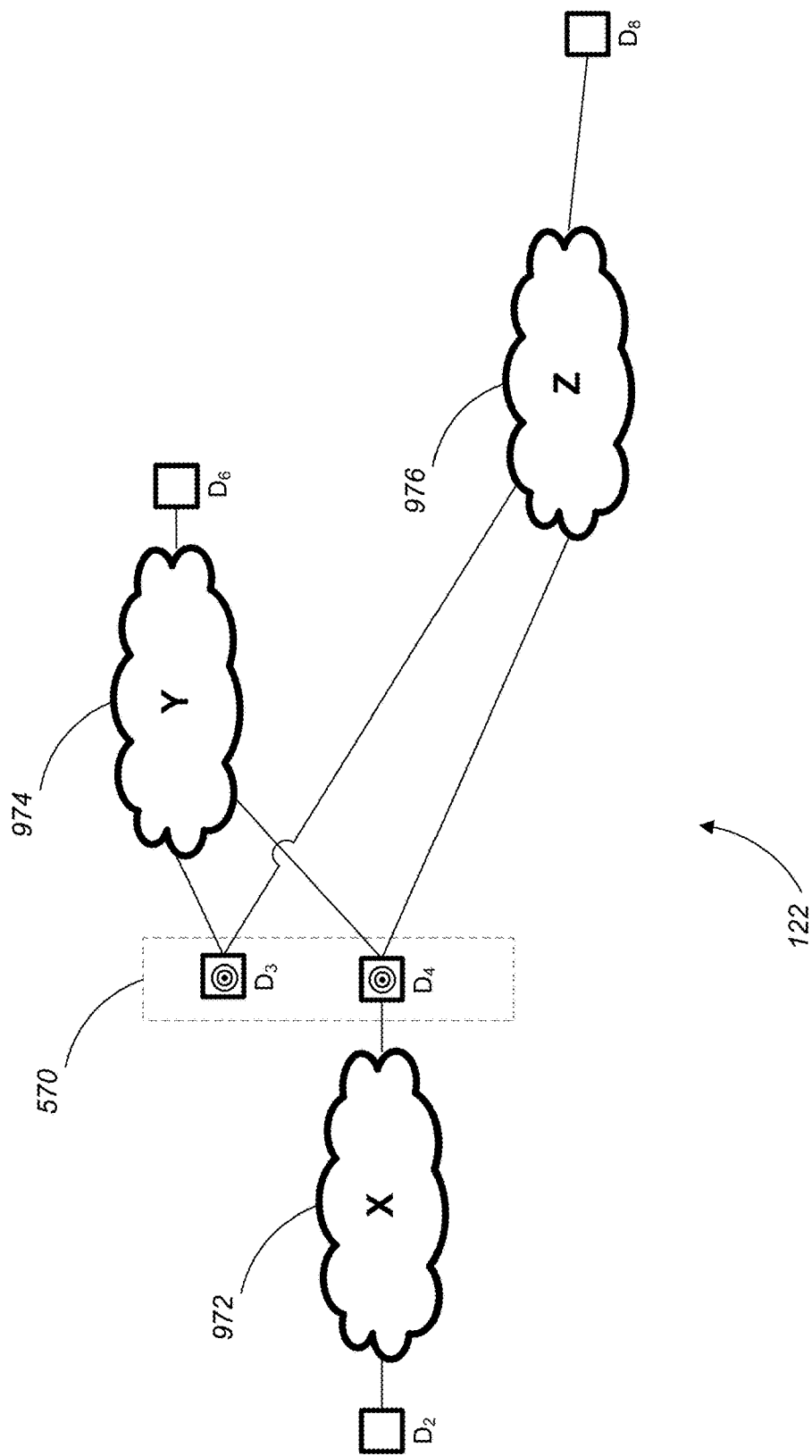
FIG. 9 is a summarized data lineage diagram for the first exemplary marked data lineage graph.

Referring to both FIGS. 8 and 9, for each unique summary node label, the summarized data lineage diagram generation step 465 generates a summary node corresponding to the label. For any summary links with a rightmost end having a given summary node label, the rightmost ends of the summary links are collapsed into a single output link extending out of the summary node to the appropriate high interest data node.

For example, both summary link $S_A$ and summary link $S_B$ have their rightmost ends labeled with summary node label 'X.' In FIG. 9, a summary node X 972 is generated with a single output link extending from the summary node X 972 to high interest data node $D_4$. The single output link represents a combination of the rightmost end of summary link $S_A$ and the rightmost end of summary link $S_B$. Similarly, in FIG. 9, a summary node Y 974 is generated with a single output link extending to high interest data node $D_6$. The single output link between summary node Y 974 and high interest data node $D_6$ represents a combination of the rightmost end of summary link $S_E$ and the rightmost end of summary link $S_F$. Also in FIG. 9, a summary node Z 976 is generated with a single output link extending to high interest data node $D_8$. The single output link between summary node Z 976 and high interest data node $D_8$ represents a combination of the rightmost end of summary link $S_D$ and the rightmost end of summary link $S_G$.

For any summary links with a leftmost end having a given summary node label, the leftmost ends of the summary links are collapsed into a single input link extending into the summary node from the appropriate high interest data node. For example, in FIG. 8, both the leftmost end of summary link $S_A$ and the leftmost end of summary link $S_B$ are labeled with the summary node label 'X.' In FIG. 9, a single input link extends into the summary node X 972 from high interest data node $D_2$. The single input link represents a combination of the leftmost end of summary link $S_A$ and the leftmost end of summary link $S_B$.

Finally, for each summary link with a leftmost end having its original summary link label, a link is generated between the data node connected to the leftmost end of the summary link and the next component downstream from the data node, whether it is a high interest data node or a summary node.

As can be seen from FIG. 9, the resulting summarized data lineage diagram 122 hides low interest data nodes and data transformation nodes in summary nodes 972, 974, 976 while preserving an overall summary of data lineage for high interest data nodes and target data nodes. Note that, in FIG. 9, the container 570 is shown in an expanded state. In some examples, when the summarized data lineage diagram 122 is displayed to the user 121, any containers including a target node are shown in an expanded state while any containers not including a target node are shown in a collapsed state.

2. Example 2

Figure 10:
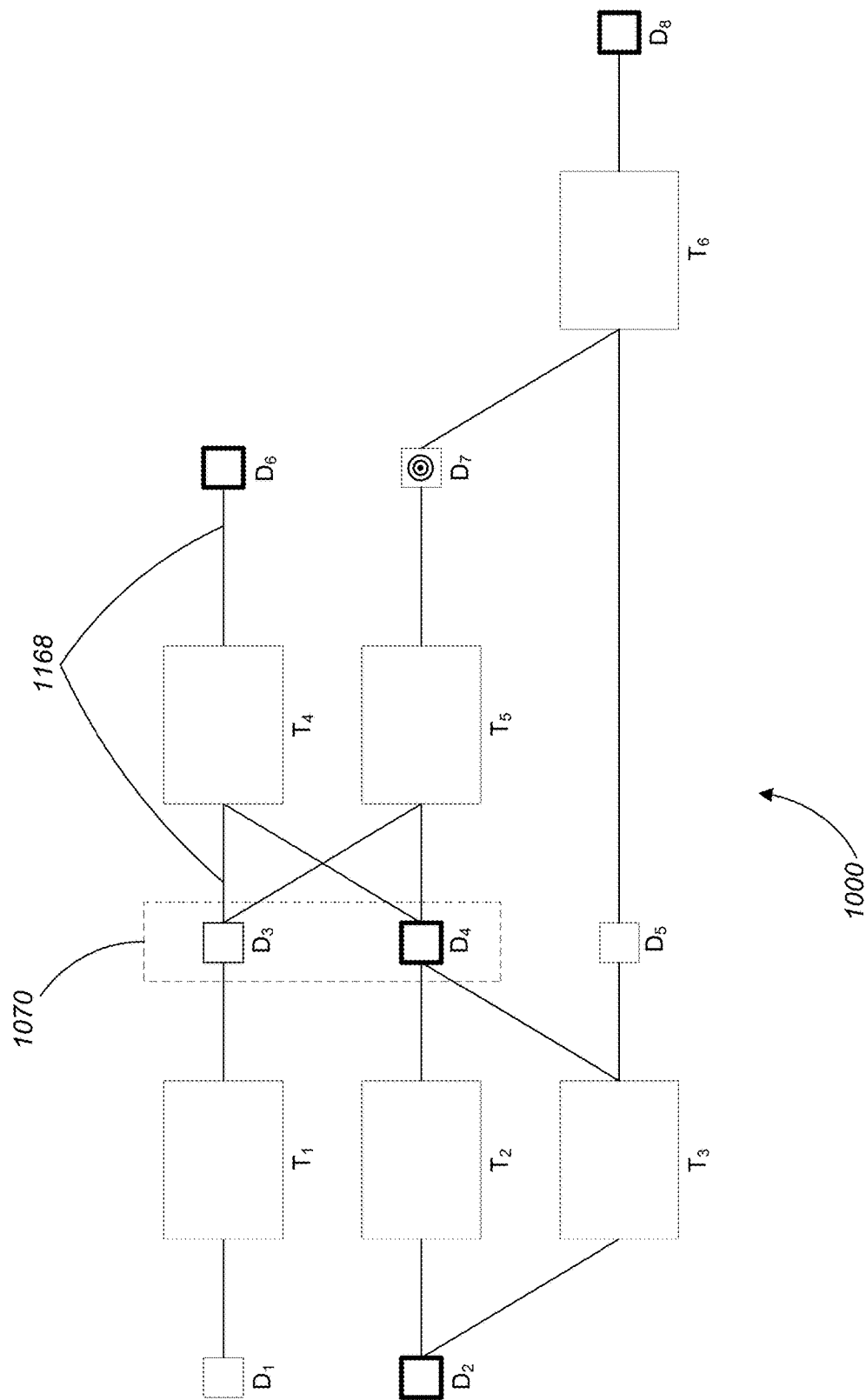
FIG. 10 is a second exemplary marked data lineage graph.

In some examples, if a target data node in the marked data lineage graph is not marked as being of high interest, the target data node along with the original links between the target data node and any neighboring data nodes of high interest are excluded from summarization. For example, referring to FIG. 10, a second example of a marked data lineage graph 1000 includes the same data nodes $D_1$-$D_8$, data transformation nodes $T_1$-$T_6$, and links 1168 as the marked data lineage graph 500 of FIG. 5. The marked data lineage graph 1000 of FIG. 10 differs from the marked data lineage graph 500 of FIG. 5 in that data node $D_3$ is not marked as being a high interest data node in FIG. 10 and the marked data lineage graph of FIG. 10 has data node $D_7$ marked as the target data node instead of data nodes $D_3$ and $D_4$ as is the case in the marked data lineage graph 500 of FIG. 5. Note that data node $D_7$, while being a marked as a target data node, is not marked as being a high interest data node. High interest data node $D_4$ is located in a container 1070.

Figure 11:
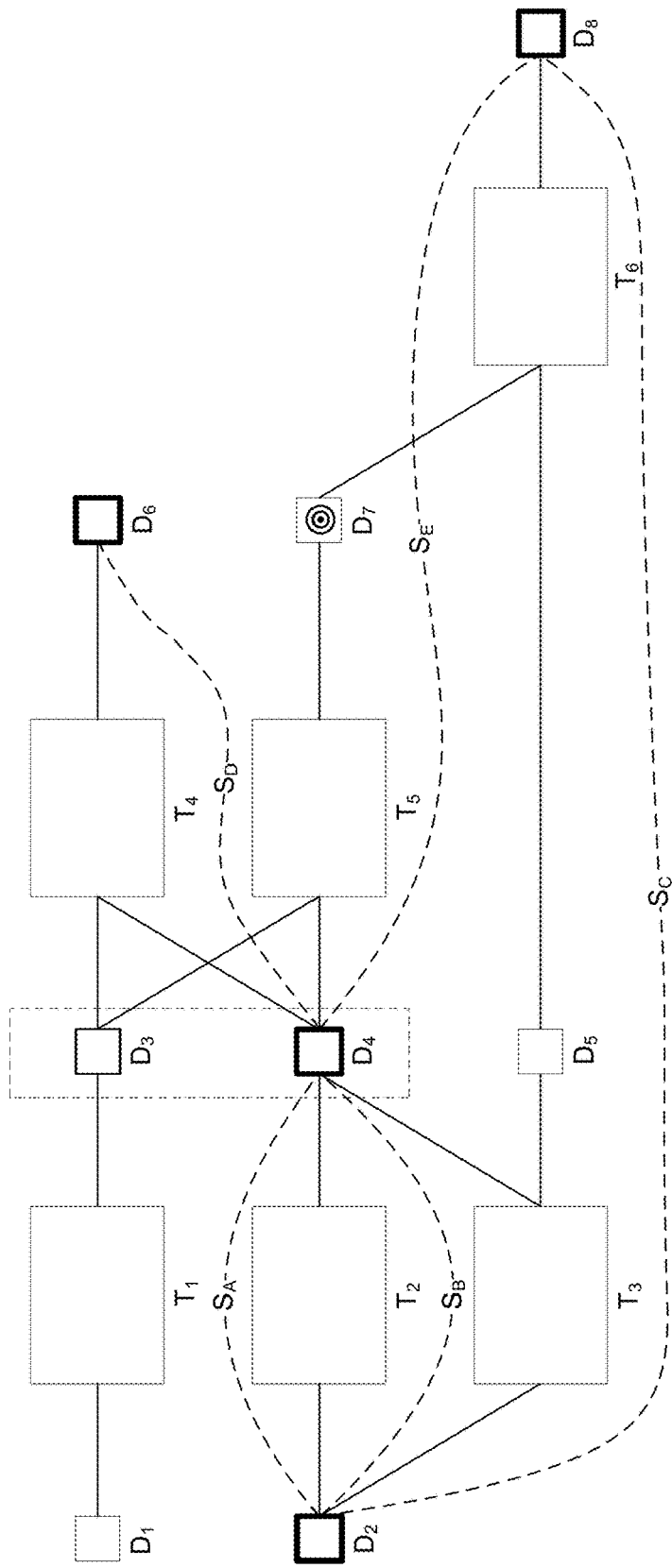
FIG. 11 is a second exemplary augmented data lineage graph including summary links generated by the summary link computation method.

Referring to FIG. 11, when the marked data lineage graph 1000 is provided to the summary link computation module 128 of FIG. 2, the procedure shown in FIG. 3 is applied to the marked data lineage graph to generate summary links $S_A$-$S_E$. For the sake of brevity, a detailed description of summary link generation for the marked data lineage graph 1000 is omitted for this second example.

Figure 12:
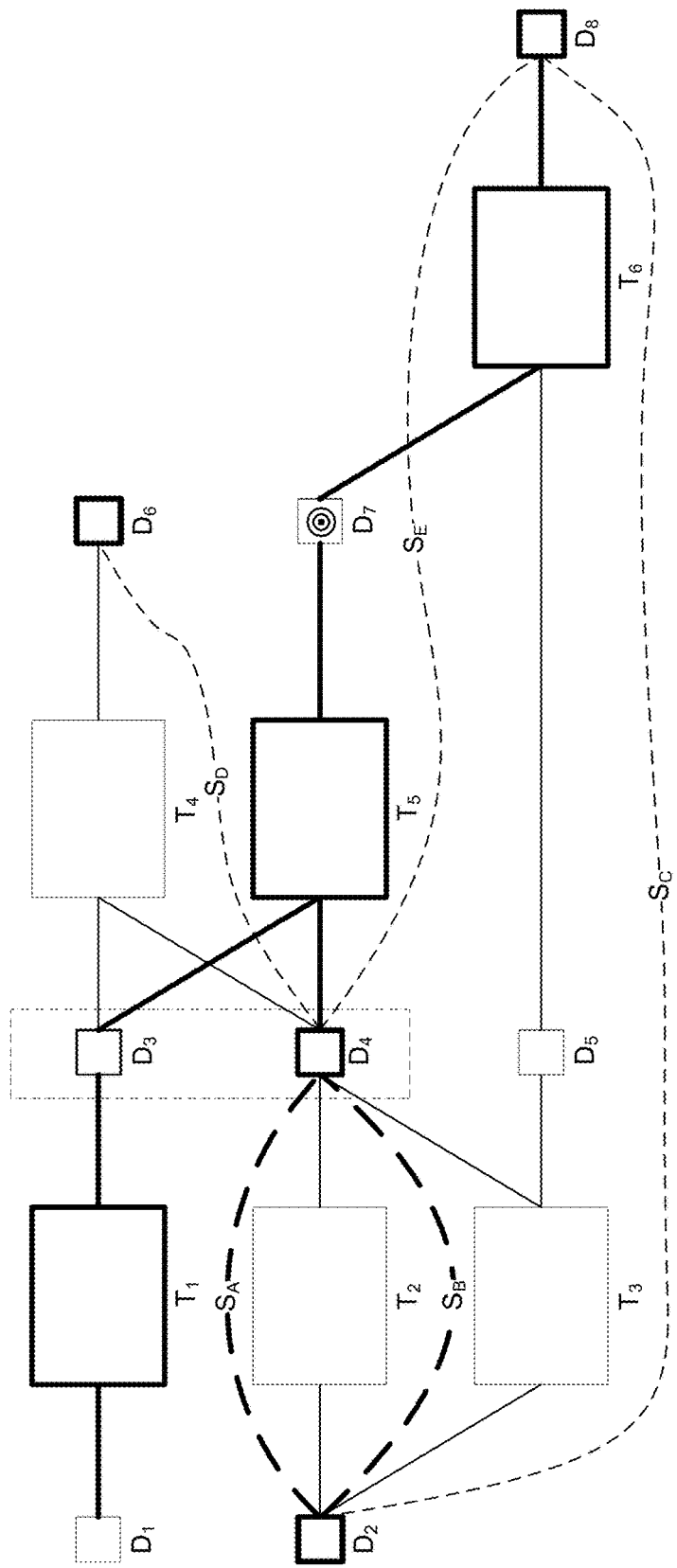
FIG. 12 is the second exemplary augmented data lineage graph after application of the method of FIG. 4.

Referring now to both FIGS. 4 and 12, the augmented data lineage graph 1127 is provided to the summarized data lineage diagram computation module 130 of FIG. 2 which applies the procedure shown in FIG. 4 to generate the summarized data lineage diagram 122. Initially, at step 452 of the procedure, the target data node in the augmented data lineage graph 1127 is identified as data node $D_7$. For both the upstream and downstream directions from $D_7$, the procedure 454 of FIG. 4 is performed on the augmented data lineage graph 1127.

First, at step 456, a test is performed to determine whether $D_7$ is marked as being of high interest. The test returns an answer of "NO" since $D_7$ is not marked as being of high interest. Since $D_7$ is not marked as being of high interest, the procedure proceeds to step 460 where each of the original links connected to $D_7$ is walked. In particular, in the downstream direction there is a single link to walk (i.e., from data node $D_7$ to data node $D_8$ via transformation node $T_6$). The link from $D_7$ to $D_8$ is walked and at step 462 a test is performed to determine whether $D_8$ is at the edge of the augmented data lineage graph 1127 (i.e., the end of the walk). The test returns an answer of 'YES' since $D_8$ is at the edge. Since the test returned an answer of YES, the walked original link, including the transformation node $T_6$ is stored for use in a later summarized lineage generation step 465 at step 464.

In the upstream direction there are three links to walk (i.e., a first link from data node $D_7$ to data node $D_1$, a second link from data node $D_7$ to data node $D_2$ via data transformation node $T_2$, and a third link from data node $D_7$ to data node $D_2$ via data transformation $T_3$). The procedure 454 first walks the first link. Since $D_7$ is not marked as being of high interest, the procedure proceeds to step 460 and walks the original link to data node $D_3$. At step 462 a test is performed to determine whether data node $D_3$ is the end of the current walk. The test returns an answer of "NO" and the procedure loops back to step 456 which performs a step to determine whether data node $D_3$ is marked as being of high interest. The test returns an answer of "NO" and the procedure proceeds to step 460 which walks the original link from data node $D_3$ to data node $D_1$ via data transformation node $T_1$. At step 462 a test is performed to determine whether data node $D_1$ is at the edge of the augmented data lineage graph 1127. The test returns an answer of 'YES' since $D_1$ is at the edge. Since the test returned an answer of 'YES,' the walked original link, including the transformation nodes $T_5$ and $T_1$ are stored for use in a later summarized lineage generation step 465 at step 464.

The procedure 454 then walks the second link. Since $D_7$ is not marked as being of high interest, the procedure 454 proceeds to step 460 and walks the original link from data node $D_7$ to data node $D_4$ via data transformation node $T_5$ at step 460. At step 462 a test is performed to determine whether data node $D_4$ is the end of the current walk. The test returns 'NO' and the procedure loops back to step 456 where a test is performed to determine whether data node $D_4$ is marked as being a high interest data node. The test returns 'YES' and the procedure proceeds to step 458 where the summary link $S_A$ is walked to data node $D_2$. At step 462 a test is performed to determine whether data node $D_2$ is at the edge of the augmented data lineage graph 1127. The test returns 'YES' since $D_2$ is at the edge. Since the test returned an answer of 'YES,' the walked link, including the original link from $D_7$ to $D_4$ (including data transformation node $T_5$) and the summary link $S_A$ is stored for use in a later summarized lineage generation step 465 at step 464.

Finally, the procedure 454 walks the third link. Since $D_7$ is not marked as being of being interest, the procedure 454 proceeds to step 460 and walks the original link from data node $D_7$ to data node $D_4$ via data transformation node $T_5$ at step 460. At step 462 a test is performed to determine whether data node $D_4$ is the end of the current walk. The test returns 'NO' and the procedure loops back to step 456 where a test is performed to determine whether data node $D_4$ is marked as being a high interest data node. The test returns 'YES' and the procedure proceeds to step 458 where the summary link $S_B$ is walked to data node $D_2$. At step 462 a test is performed to determine whether data node $D_2$ is at the edge of the augmented data lineage graph 127. The test returns 'YES' since $D_2$ is at the edge. Since the test returned an answer of 'YES,' the walked link, including the original link from $D_7$ to $D_4$ (including data transformation node $T_5$)

and the summary link $S_B$ is stored for use in a later summarized lineage generation step 465 at step 464.

The walked links stored by step 464 for target data node $D_7$ are provided to step 465 which generates summary nodes from the stored summary links. Step 465 then integrates the generated summary nodes with the original links stored by step 464 to generate the summarized data lineage diagram 122. The summarized data lineage diagram 122 is provided to a data lineage display step 466 which displays the summarized data lineage diagram 122 to the user.

Figure 13:
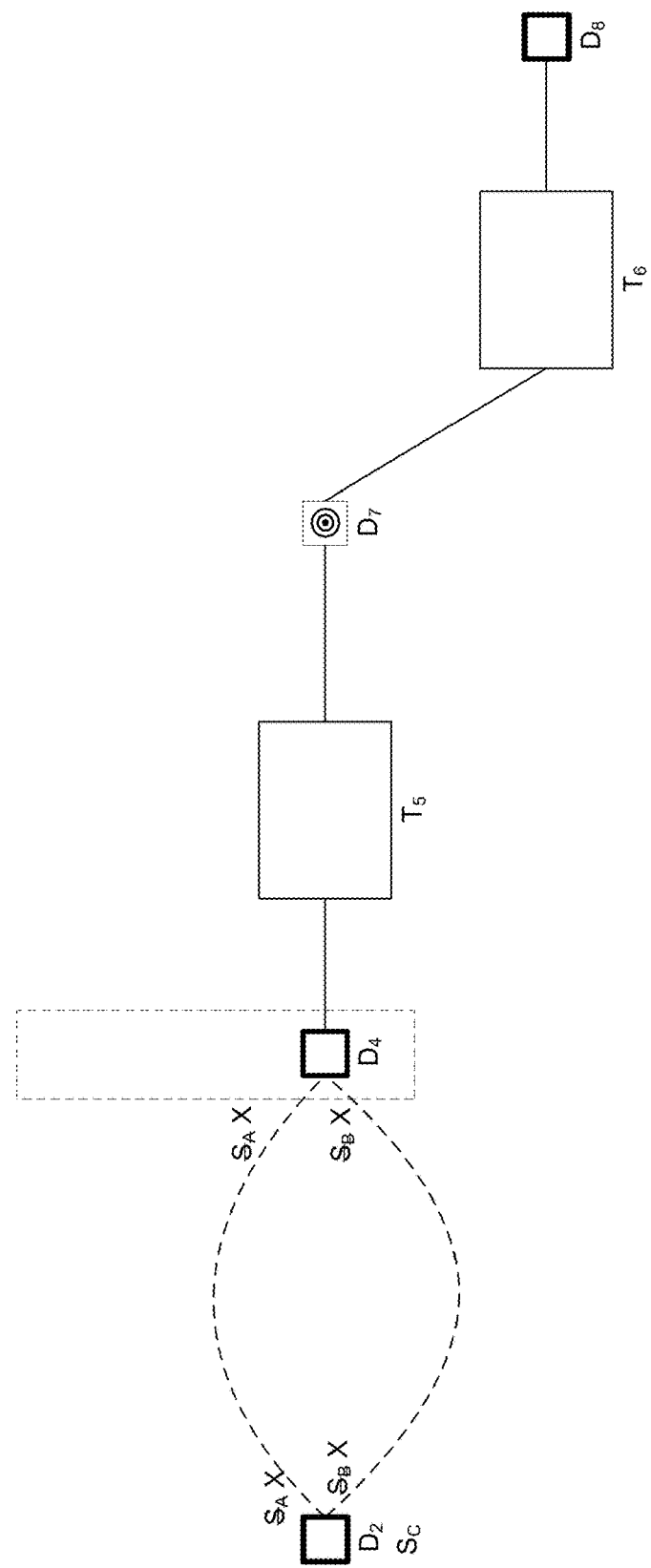
FIG. 13 illustrates a method for summary node generation for the second exemplary augmented data lineage graph.

Referring to FIG. 13, the summarized data lineage diagram generation step 465 receives the output of the procedure loop 454 of FIG. 4. The output of the procedure loop 454 includes the high interest data nodes from the marked data lineage graph, the target data node $D_7$, and the links (both summary links and original links) stored by step 464 of FIG. 4. As was the case in the previous example, for each summary link, the summarized data lineage diagram generation step 465 labels each end of the link (i.e., the rightmost end and the leftmost end) with the same label (e.g., the name of the summary link). In this example, summary link $S_A$ has its rightmost end labeled $S_A$ and its leftmost end labeled as $S_A$. Similarly, summary link $S_B$ has its rightmost end labeled $S_B$ and its leftmost end labeled as $S_B$. Note that while $D_1$, $T_1$, and $T_3$ are part of a walked link stored by step 464, they are not included in the diagram of FIG. 13 since none of $D_1$, $T_1$, and $D_3$ is located on a path between two high interest data nodes.

For each high interest data node, any summary link(s) having their rightmost ends connected to the high interest data node are identified. If the rightmost ends of more than one summary link are connected to the high interest data node, then the rightmost ends of each summary link connected to the high interest data node have their respective labels replaced with a summary node label. For example, the rightmost ends of summary links $S_A$ and $S_B$ are connected to high interest data node $D_4$. The labels for the rightmost ends of summary links $S_A$ and $S_B$ are both replaced with the summary node label 'X.'

For each high interest data node, any summary link(s) having their leftmost ends connected to the high interest data node are identified. For any set of two or more of the identified summary links which have the same summary node label for their rightmost ends, the labels for the leftmost ends of the summary links are replaced with the summary node label of the summary link's rightmost end. For example, summary link $S_A$ and summary link $S_B$ have their leftmost ends connected to high interest data node $D_2$. The labels for the rightmost ends of both $S_A$ and $S_B$ both assigned the summary node label 'X' (as is described above). Upon identifying this situation, the summarized data lineage diagram generation step 465 replaces the labels of the leftmost ends of summary link $S_A$ and summary link $S_B$ with the summary node label 'X.'

Figure 14:
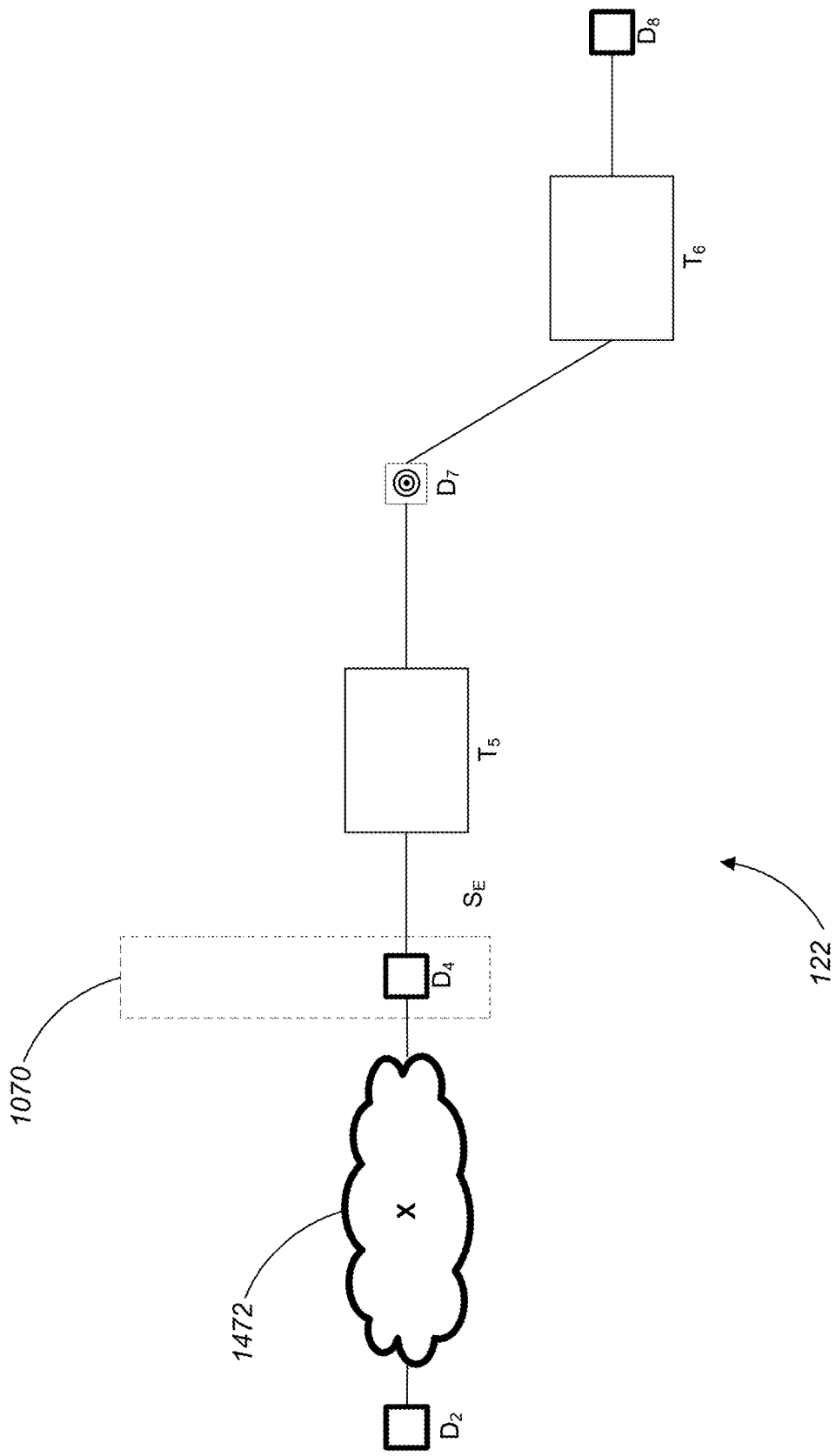
FIG. 14 is a summarized data lineage diagram for the second exemplary marked data lineage graph.

Referring to both FIGS. 13 and 14, for each unique summary node label, the summarized data lineage diagram generation step 465 generates a summary node corresponding to the label. For any summary links with a rightmost end having a given summary node label, the rightmost ends of the summary links are collapsed into a single output link extending out of the summary node to the appropriate high interest data node.

For example, both summary link $S_A$ and summary link $S_B$ have their rightmost ends labeled with summary node label 'X.' In FIG. 14, a summary node X 1472 is generated with a single output link extending from the summary node X 1472 to high interest data node $D_4$. The single output link represents a combination of the rightmost end of summary link $S_A$ and the rightmost end of summary link $S_B$.

For any summary links with a leftmost end having a given summary node label, the leftmost ends of the summary links are collapsed into a single input link extending into the summary node from the appropriate high interest data node. For example, in FIG. 13, both the leftmost end of summary link $S_A$ and the leftmost end of summary link $S_B$ are labeled with the summary node label 'X.' In FIG. 14, a single input link extends into the summary node X 1472 from high interest data node $D_2$. The single input link represents a combination of the leftmost end of summary link $S_A$ and the leftmost end of summary link $S_B$.

Any original links such as the link between data node $D_7$ and data node $D_8$ via data transformation node $T_6$ and the link between data node $D_7$ and data node $D_4$ via data transformation node $T_5$ are included in their original form from the marked data lineage graph 1000.

As can be seen from FIG. 14, the resulting summarized data lineage diagram 122 hides low interest data nodes and low interest data transformation nodes in the X summary node 1472 while preserving an overall summary of data lineage for high interest data nodes and target data nodes. Note that, in FIG. 14, the container 1070 is shown in an expanded state. In some examples, when the summarized data lineage diagram 122 is displayed to the user 121, the container 1070 may be shown in a collapsed state since it does not include any target data nodes.

3 Example 3

While the examples set forth above are useful for illustrating the lineage summarization mechanism, it is important to note that in a real-world implementation, the dataflow graphs on which the lineage summarization approaches operate are much larger and more complex than those set forth in the examples.

Figure 15:
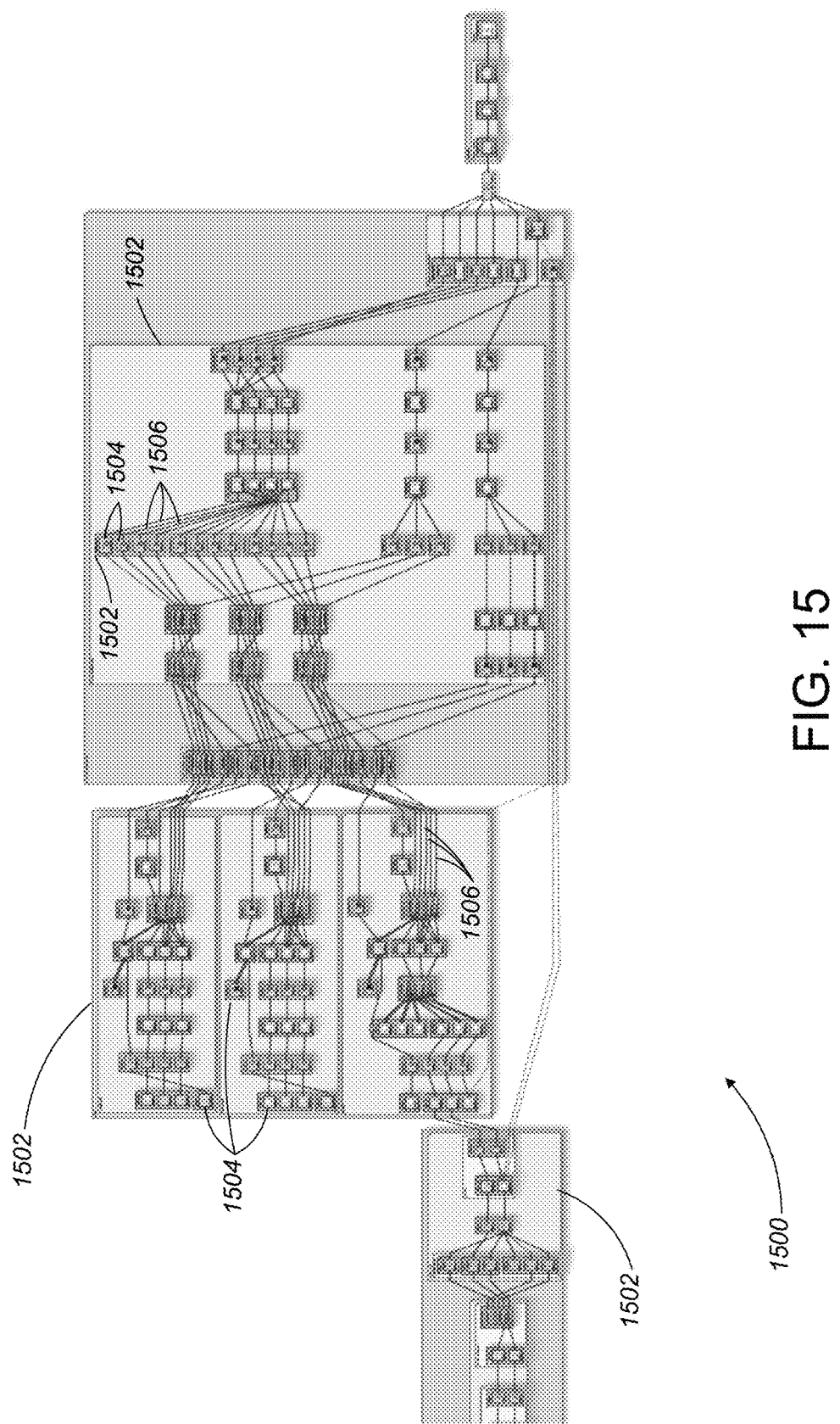
FIG. 15 is an exemplary data lineage report prior to data lineage summarization.

For example, referring to FIG. 15, a data lineage report 1500 for an exemplary dataflow graph includes a number of container objects 1502, some of which are nested. Each of the container objects includes one or more dataflow graph components 1504. A complex web of data flows 1506, interconnects the dataflow graph components 1504. Due to large number of dataflow graph components 1504 and to the complexity of the data flows 1506 interconnecting the components 1504, the exemplary data lineage report 1500 is an ideal candidate for data lineage summarization.

Figure 16:
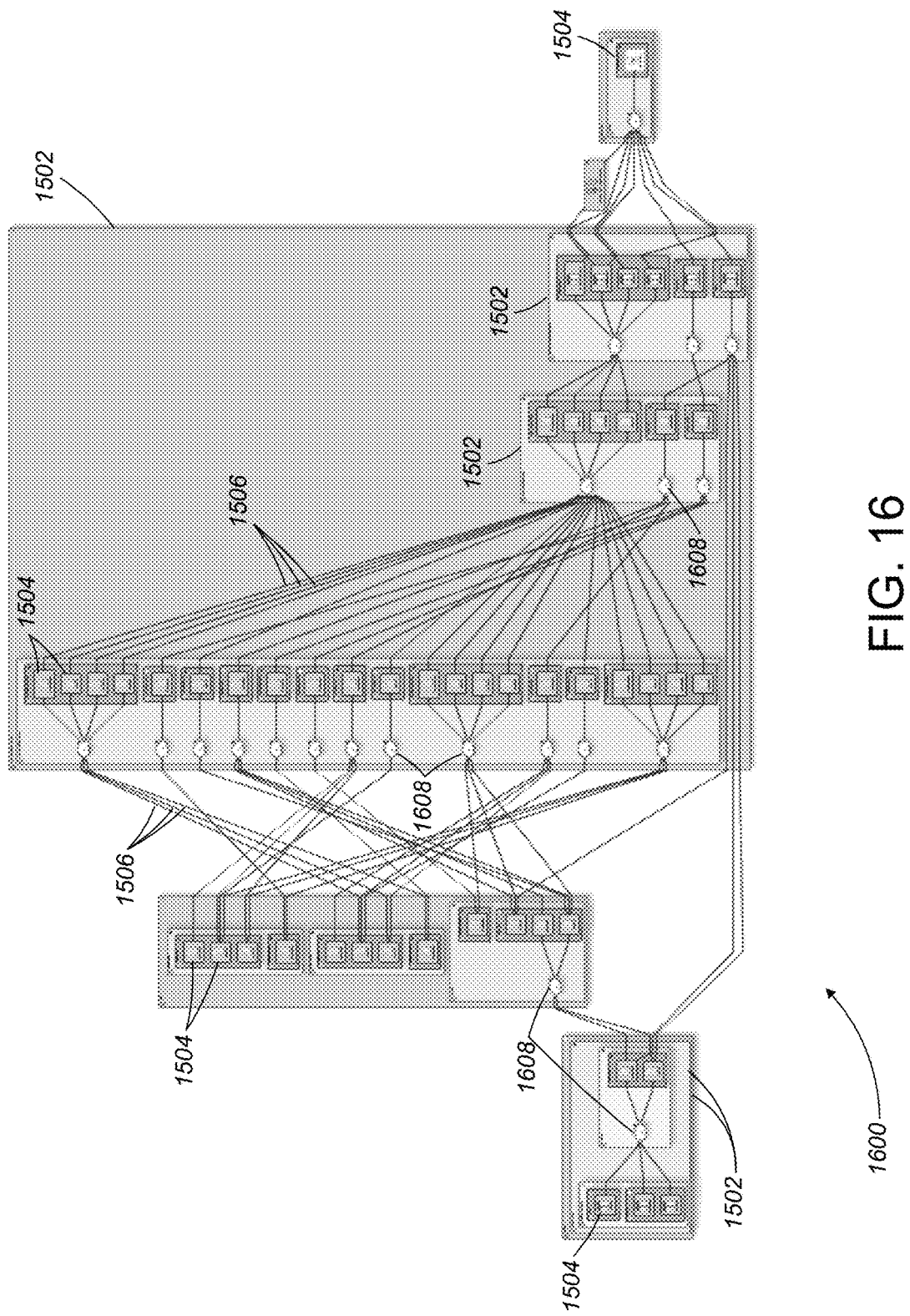
FIG. 16 is a summarized version of the data lineage report of FIG. 15.

Referring to FIG. 16, a summarized data lineage report 1600 is the result of performing data lineage summarization on the data lineage report 1500 of FIG. 15. The summarized data lineage report 1600 includes a number of cloud icons 1608 symbolizing summarized dataflow graph components, data flows, and container objects. As is apparent from the figure, the summarized data lineage report 1600 includes fewer dataflow graph components and fewer data flows, resulting in a simplified and more easily understood data lineage report.

Figure 17:
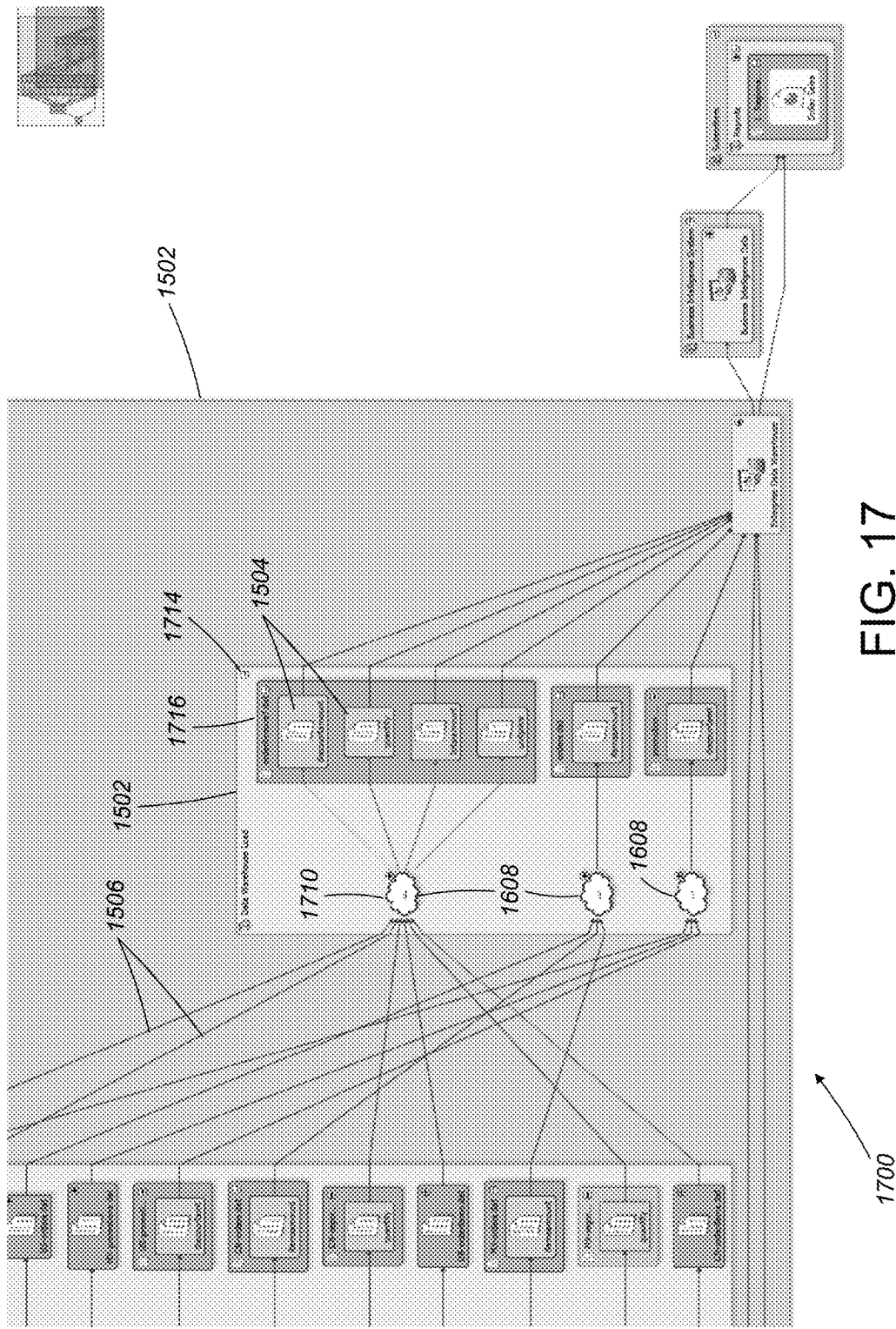
FIG. 17 is a portion of a summarized data lineage report including expandable cloud icons.
Figure 18:
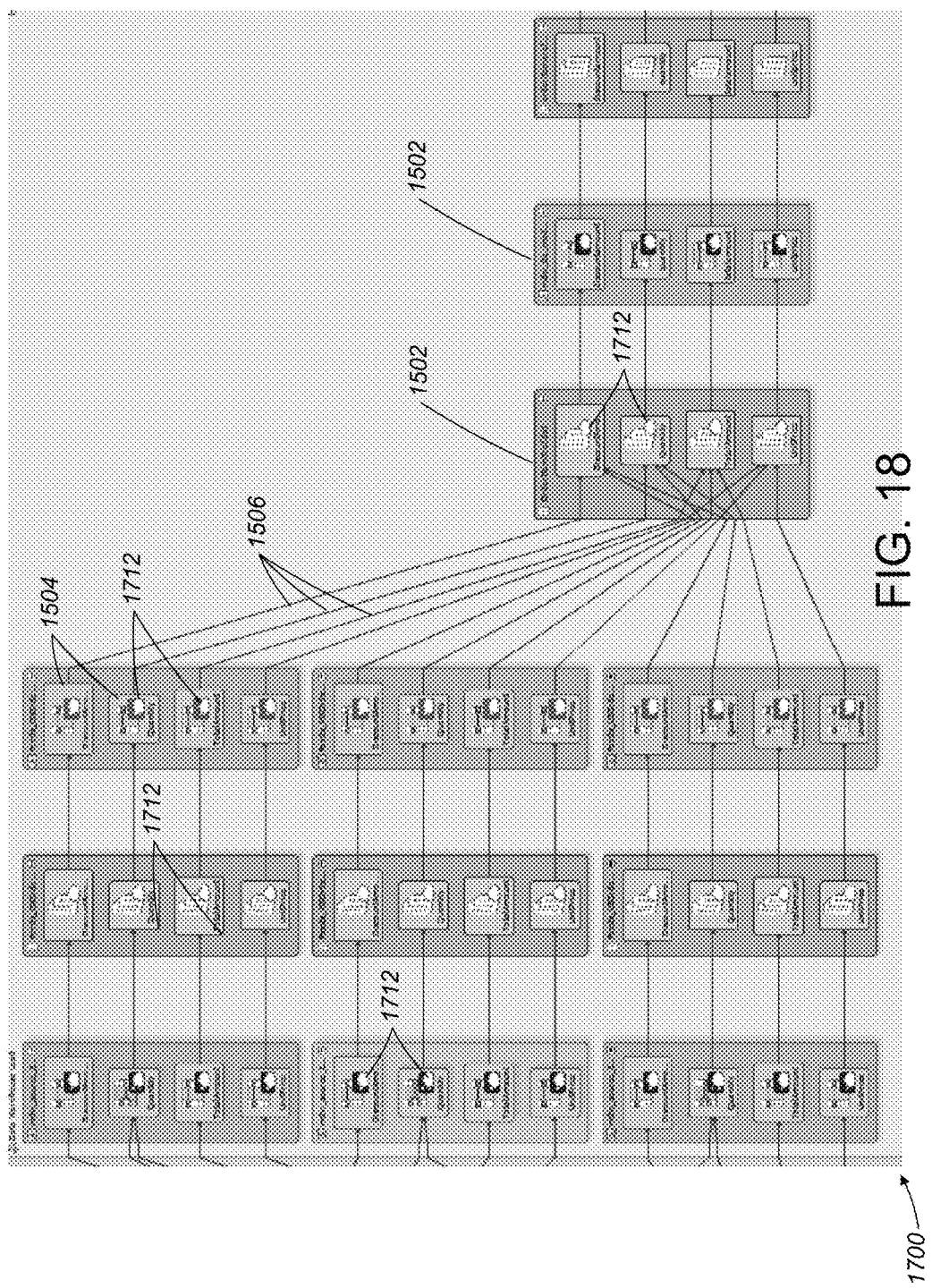
FIG. 18 shows a portion of the summarized data lineage report of FIG. 17 after expansion of one of the cloud icons.

Referring to FIG. 17, a detailed view of a portion of another example of a summarized data lineage report 1700 shows a closer view of the cloud icons 1608, including a first cloud icon 1710. In particular, each cloud icon 1608 is shown to include a hyperlink with the text " . . . " and to include a "+" symbol. Clicking on either of these aspects of a given cloud icon 1608 causes expansion of the cloud icon 1608, revealing the data flow graph components, data flows, and container objects that are represented by the given cloud icon. For example, referring to FIG. 18, when a user clicks on the "+" symbol to expand the first cloud icon 1710, the first could icon 1710 is expanded, showing all of the container objects, dataflow graph components, and data flows summarized by the first could icon 1710 in the data lineage report 1700. Note that each component that was previously summarized by the first cloud icon 1710 includes a smaller version of the cloud icon 1712, indicating that the dataflow graph component was previously summarized by a cloud icon (i.e., the first cloud icon 1710).

In some examples, a summarized data lineage can be included within a lineage diagram along with one or more other forms of lineage clarification mechanisms. For example, a lineage diagram can include an interactive clarification mechanism that dynamically responds to a user's input to collapse portions of the rendered lineage diagram that include nodes that are not of interest to the user. Referring again to FIG. 17, in addition to the ability to expand (and collapse) summarized portions represented by cloud icons 1608, a user has the ability to collapse the container object 1502 with the user interface element represented by the "−" symbol 1714, and dataset nodes nested inside, such as the dataset node 1716, and to expand collapsed portions (as described in more detail in U.S. application Ser. No. 12/629,466, which was published as U.S. 2010/0138431, entitled "VISUALIZING RELATIONSHIPS BETWEEN DATA ELEMENTS AND GRAPHICAL REPRESENTATIONS OF DATA ELEMENT ATTRIBUTES," incorporated herein by reference). Another example of a clarification mechanism that can be included is a filtering function that adds or excludes nodes from the lineage diagram based on tag values associated with the nodes (as described in more detail in U.S. Application Ser. No. 62/114,684, entitled "FILTERING DATA LINEAGE DIAGRAMS," incorporated herein by reference). By combing any two of these three mechanisms, or even all three of these mechanisms, the power to clarify the resulting lineage diagram is greatly increased since the mechanisms can complement each other and provide synergistic flexibility to allow a user fine-grained control over what portions of a data lineage diagram are rendered.

The different clarification mechanisms can be used simultaneously, and each mechanism enables a user to have explicit control on whether that particular mechanism is applied to a particular portion of the lineage. For example, on the left side of a lineage diagram, a user may expand a container object that contains within it a cloud object, which the user may or may not expand, and on the right side the user may expand a cloud object that contains within it a container object, which the user may or may not expand. This fine-grained control can be applied recursively in different portions of the lineage diagram, with the system dynamically rendering an updated lineage diagram based on the user's interaction. The filtering can also be controlled at a fine-grained level by limiting the filtering to be applied to only selected portions of the lineage diagram. Also, clarification mechanisms other than these three examples can also be included for even further control. For example, the rendering of a lineage diagram can be selected limited to only a maximum radius (in terms of hops from a target node), or rendered successive hops at a time, under user control.

4 Federation of Metadata

In some examples, the lineage summarization approaches described above can be used to simplify a presentation of federated metadata. For example, certain organizations have a number of individual repositories for maintaining metadata. A central repository is used to manage at least some of the metadata that is distributed across the individual repositories. In some examples, one of the individual repositories is designated as the central repository. In other examples, a separate entity is designated as the central repository.

In general, the central repository manages corporate assets (e.g., a corporate glossary or other corporate assets) and distributes the corporate assets among the individual repositories, as needed. By having corporate assets managed at a central repository, consistency of the corporate assets, including corporate terminology is maintained across the organization.

Certain high level users can obtain a high level data lineage diagram using the central repository, the high level data lineage diagram including all of the metadata lineages of the individual repositories combined into a single data lineage diagram. To generate such a high level data lineage diagram, the central repository retrieves metadata from multiple of the individual repositories and combines the retrieved metadata.

The data lineage summarization approaches described above can be used to group portions of individual repositories or entire individual repositories into summary nodes, indicating that the grouped portions are of low interest to the user. In some examples, the metadata lineage for the grouped portions is not retrieved from the individual repositories until the user expands the summary node for the group, indicating interest in the lineage for the individual repositories.

5 Alternatives

In some examples, all nodes in a marked data lineage graph are initially marked as being of low interest. The user then selectively (e.g., either through a user interface or programmatically), designates certain data nodes as being of high interest. In some examples, approaches automatically mark a node in a data lineage as being of high interest based on relationships between the node and other nodes in the data lineage. For example, if the node is in the same dataset as a node of high interest, then the node may be marked as high interest as well. In some examples, certain nodes may be marked as high interest due to their relative position with respect to nodes of high interest in the data lineage. For example, certain nodes adjacent to a node of high interest may also be marked as being of high interest.

In some examples, users classify each data node into one of two categories: "detailed" (i.e., a low interest node that is only displayed in a detailed view of a data lineage diagram), or "summarized" (i.e., a high interest node that is displayed in both the a detailed view and a summarized view of a data lineage diagram). In some examples, the categories that determine whether a node is of low interest or high interest are based on categories that characterize the nature of the item that the node represents, such as "system architecture" or "regulatory".

In some examples, to identify collections of low interest data nodes within a topology, the data nodes are collapsed regardless of any hierarchy among the data nodes. A rule is implemented requiring that there be a single set of low interest nodes per output dataset. In some examples, the sets may include duplicative elements. In some examples, the summary nodes are associated with the physical/logical group associated with a single output data node. In other examples, a summary node is associated with a physical/logical group that contains the most low interest data nodes if there are no nodes of low interest associated with physical/logical group of output nodes.

In some examples, summary nodes are represented in a data lineage diagram by cloud icons. In other examples, other types of summary node icons are used. In some examples, a summary node displays little or no information about its contents. In other examples, summary nodes display a limited amount of information about their contents (e.g., the number of nodes included therein, the number of systems included therein, and so on). In some examples a user can click a link in a summary node to display an information bubble for the summarized section of the lineage. The user can then expand each summarized section to view expanded details about the summary node. In some examples, when a user expands a summarized section of the data lineage diagram, the original links summarized by the summary links and associated with the summarized section of the data lineage diagram are walked to determine a data lineage diagram for the summarized section of the data lineage diagram. The data lineage diagram of the summarized section is then displayed to the user. The user can then click the expanded details to revert to the summarized lineage. That is, the user is allowed to drill down to details (i.e., expand the summary node) and re-collapsing on a per summary node basis. In this way, the user can navigate to specific details if they choose to do so.

6 Implementations

The data lineage summarization approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing lineage information in a computing system, the method including:

receiving, over an input device or port, an identification of a directed graph that includes one or more data nodes that represent data elements, and includes directed links between data nodes that represent respective lineage relationships between data elements that are received and produced, respectively, by a computation during execution of the computation, or directed links between data nodes and data transformation nodes that represent computations that transform data elements, where the directed links between data nodes and data transformation nodes represent respective lineage relationships between a computation and a data element to be received or produced by the computation during execution of the computation; and computing, using at least one processor, display information based on paths over directed links in the directed graph and hierarchical container relationships among nodes in the directed graph, and using the display information to generate a data lineage diagram as a visual representation of at least portions of the directed graph, the computing including:

traversing nodes along the paths over directed links in the directed graph and determining one or more of the nodes of the directed graph to exclude from the data lineage diagram based at least in part on any tag identifiers or tag values associated with traversed nodes, where at least one of the traversed nodes is associated with one or more tag identifiers of a plurality of tag identifiers, and at least one tag identifier of the plurality of tag identifiers has a plurality of possible tag values;

receiving designation of interest for a plurality of the nodes of the directed graph;

generating one or more summary objects included in the display information for one or more remaining nodes not included in the plurality of nodes of interest and not excluded based on the traversing, a first summary object of the one or more summary objects including summary information based on a first path over directed links in the directed graph between a first node of interest and a second node of interest; and generating one or more container objects included in the display information according to the hierarchical container relationships among the nodes, where each container object is able to be represented both by both a collapsed visual representation in the data lineage diagram, and an expanded visual representation in the data lineage diagram that contains visual representations of at least one of: (1) one or more data transformation nodes or data nodes, (2) one or more summary objects, or (3) one or more container objects;

wherein generating the first summary object includes traversing the first path between the first node of interest and the second node of interest to identify one or more remaining nodes that are not designated as being of interest along the first path, and forming the summary information for the identified one or more remaining nodes.

2. The method of claim 1 further including generating a data lineage diagram as a visual representation of at least portions of the directed graph, in which each node designated as being of interest is represented by its own icon, and a plurality of the remaining nodes are represented by a common icon connected to a plurality of nodes of interest according to summary information stored in one or more of the summary objects.

3. The method of claim 2 further including receiving a user input indicative of a user's desire to view details associated with the common icon and, in response to the user input, traversing the plurality of remaining nodes represented by the common icon and visually representing the remaining nodes in the data lineage diagram based on the traversal of paths of the directed graph including the plurality of remaining nodes associated with the summary information.

4. The method of claim 2 further including
receiving a designation of one of the data transformation nodes or one of the data nodes as a target node,
wherein generating the data lineage diagram includes traversing one or more paths through the directed graph, each path of the one or more paths including two or more nodes of interest and the target node.

5. The method of claim 4 wherein for at least some of the one or more paths through the directed graph, traversing the path includes traversing a first portion of the path in an upstream direction from the target node and traversing a second portion of the path in a downstream direction from the target node.

6. The method of claim 5 wherein traversing the first portion of the path includes determining whether the target node is marked as being a node of interest, and
if the target node is determined to be a node of interest, traversing a link corresponding to a summary object associated with the target node from the target node to a first upstream node of interest, otherwise
if the target node is not determined to be a node of interest, traversing an original path of the directed graph between the target node and the first upstream node of interest, including traversing one or more data transformation nodes or data nodes that are not designated as being of interest.

7. The method of claim 6 wherein traversing the first portion of the path further includes traversing a link corresponding to a summary object associated with the first upstream node of interest from the first upstream node of interest to a second upstream node of interest.

8. The method of claim 5 wherein traversing the second portion of the path includes determining whether the target node is marked as being a node of interest, and
if the target node is determined to be a node of interest, traversing a link corresponding to a summary object associated with the target node from the target node to a first downstream node of interest, otherwise
if the target node is not determined to be a node of interest, traversing an original path of the directed graph between the target node and the first downstream node of interest, including traversing one or more data transformation nodes or data nodes that are not designated as being of interest.

9. The method of claim 8 wherein traversing the second portion of the path further includes traversing a link corresponding to a summary object associated with the first downstream node of interest from the first downstream node of interest to a second downstream node of interest.

10. The method of claim 2 wherein the one or more summary objects includes two or more summary objects, generating the linage diagram further includes merging at least some of the two or more summary objects into a summary node represented by the common icon.

11. The method of claim 10 wherein merging at least some of the two or more summary objects into the summary node includes analyzing relationships between the nodes of interest linked by the at least some of the two or more summary objects to determine whether merging the at least some of the two or more summary objects is possible.

12. The method of claim 11 wherein analyzing relationships between the nodes of interest includes determining that the at least some of the two or more summary objects are associated with a common downstream node of interest.

13. The method of claim 1, wherein the designation of interest for at least some of the nodes is received from a user.

14. The method of claim 1, wherein the designation of interest for at least some of the nodes is generated by the computing system.

15. The method of claim 14, wherein the computing system generates the designation of interest for at least some of the nodes based on a position of the at least some of the nodes relative to a position of other nodes designated as being of interest.

16. The method of claim 14, wherein the computing system generates the designation of interest for at least some of the nodes based on the at least some of the nodes sharing a data structure with other nodes designated as being of interest.

17. The method of claim 2 wherein the computing system includes a plurality of separate, interconnected sub-systems, the portions of the directed graph being distributed among at least some of the sub-systems.

18. The method of claim 17 wherein at least some of the sub-systems are represented by the common icon.

19. The method of claim 1 wherein traversing nodes along the paths over directed links in the directed graph and determining one or more of the nodes of the directed graph to exclude from the data lineage diagram includes:
determining an association between a first node and at least a first tag identifier of the plurality of tag identifiers, and determining a first subset of at least one and fewer than all of a plurality of possible tag values for the first tag identifier; and
traversing nodes along a first lineage path of directed links from the first node to determine a data lineage for the first node, where the data lineage includes one or both of (1) a dependency lineage that consists of a unidirectional upstream lineage path of directed links upstream of the first node, and (2) an impact lineage that consists of a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

20. The method of claim 19 wherein determining the data lineage includes, for each traversed node:
adding the traversed node to the data lineage if the traversed node is not associated with the first tag identifier, or the traversed node is associated with the first tag identifier and is associated with at least one tag value of the first subset; or
excluding the traversed node from the data lineage if the traversed node is associated with the first tag identifier and is not associated with at least one tag value of the first subset.

21. The method of claim 20 further including, upon excluding a traversed node from the data lineage, terminating traversing of the first lineage path.

22. The method of claim 19 further including analyzing the plurality of nodes, prior to traversing the nodes of the plurality of nodes, to determine a first subset of the plurality of nodes that are associated with the first tag identifier and are not associated with at least one tag value of the first subset of the plurality of possible tag values for the first tag identifier.

23. The method of claim 22 wherein determining whether to add the traversed node to the data lineage or to exclude the traversed node from the data lineage includes determining whether the traversed node is included in the first subset of the plurality of nodes.

24. The method of claim 23 wherein determining whether to add the traversed node to the data lineage includes adding the traversed node to the data lineage if the traversed node is not included in the first subset of the plurality of nodes and excluding the traversed node from the data lineage if the traversed node is included in the first subset of the plurality of nodes.

25. The method of claim 1 wherein the expanded visual representation of the container object in the data lineage diagram contains visual representations of at least two of: (1) one or more data transformation nodes or data nodes, (2) one or more summary objects, or (3) one or more container objects.

26. The method of claim 25 wherein the expanded visual representation of the container object in the data lineage diagram contains visual representations of: (1) one or more data transformation nodes or data nodes, (2) one or more summary objects, and (3) one or more container objects.

27. The method of claim 1 wherein the directed graph includes directed links between data nodes and data transformation nodes that represent computations that transform data elements, where the directed links between data nodes and data transformation nodes represent respective lineage relationships between a computation and a data element to be received or produced by the computation during execution of the computation.

28. Software stored in a non-transitory form on a computer-readable medium, for managing lineage information in a computing system, the software including instructions for causing a computing system to:
receive, over an input device or port, an identification of a directed graph that includes one or more data nodes that represent data elements, and includes directed links between data nodes that represent respective lineage relationships between data elements that are received and produced, respectively, by a computation during execution of the computation, or directed links between data nodes and data transformation nodes that represent computations that transform data elements, where the directed links between data nodes and data transformation nodes represent respective lineage relationships between a computation and a data element to be received or produced by the computation during execution of the computation; and
compute, using at least one processor, display information based on paths over directed links in the directed graph and hierarchical container relationships among nodes in the directed graph, and using the display information to generate a data lineage diagram as a visual representation of at least portions of the directed graph, the computing including:
traversing nodes along the paths over directed links in the directed graph and determining one or more of the nodes of the directed graph to exclude from the data lineage diagram based at least in part on any tag identifiers or tag values associated with traversed nodes, where at least one of the traversed nodes is associated with one or more tag identifiers of a plurality of tag identifiers, and at least one tag identifier of the plurality of tag identifiers has a plurality of possible tag values;
receiving designation of interest for a plurality of the nodes of the directed graph;
generating one or more summary objects included in the display information for one or more remaining nodes not included in the plurality of nodes of interest and not excluded based on the traversing, a first summary object of the one or more summary objects including summary information based on a first path over directed links in the directed graph between a first node of interest and a second node of interest; and
generating one or more container objects included in the display information according to the hierarchical container relationships among the nodes, where each container object is able to be represented both by both a collapsed visual representation in the data lineage diagram, and an expanded visual representation in the data lineage diagram that contains visual representations of at least one of: (1) one or more data transformation nodes or data nodes, (2) one or more summary objects, or (3) one or more container objects;
wherein generating the first summary object includes traversing the first path between the first node of interest and the second node of interest to identify one or more remaining nodes that are not designated as being of interest along the first path, and forming the summary information for the identified one or more remaining nodes.

29. The software of claim 28 further including instructions for causing a computing system to generate a data lineage diagram as a visual representation of at least portions of the directed graph, in which each node designated as being of interest is represented by its own icon, and a plurality of the remaining nodes are represented by a common icon connected to a plurality of nodes of interest according to summary information stored in one or more of the summary objects.

30. The software of claim 29 further including instructions for causing a computing system to receive a user input indicative of a user's desire to view details associated with the common icon and, in response to the user input, traverse the plurality of remaining nodes represented by the common icon and visually representing the remaining nodes in the data lineage diagram based on the traversal of paths of the directed graph including the plurality of remaining nodes associated with the summary information.

31. The software of claim 29 further including instructions for causing a computing system to
receive a designation of one of the data transformation nodes or one of the data nodes as a target node,
wherein generating the data lineage diagram includes traversing one or more paths through the directed graph, each path of the one or more paths including two or more nodes of interest and the target node.

32. The software of claim 31 wherein for at least some of the one or more paths through the directed graph, traversing the path includes traversing a first portion of the path in an upstream direction from the target node and traversing a second portion of the path in a downstream direction from the target node.

33. The software of claim 32 wherein traversing the first portion of the path includes determining whether the target node is marked as being a node of interest, and
if the target node is determined to be a node of interest, traversing a link corresponding to a summary object associated with the target node from the target node to a first upstream node of interest, otherwise
if the target node is not determined to be a node of interest, traversing an original path of the directed graph between the target node and the first upstream node of interest, including traversing one or more data transformation nodes or data nodes that are not designated as being of interest.

34. The software of claim 33 wherein traversing the first portion of the path further includes traversing a link corresponding to a summary object associated with the first upstream node of interest from the first upstream node of interest to a second upstream node of interest.

35. The software of claim 32 wherein traversing the second portion of the path includes determining whether the target node is marked as being a node of interest, and
if the target node is determined to be a node of interest, traversing a link corresponding to a summary object associated with the target node from the target node to a first downstream node of interest, otherwise
if the target node is not determined to be a node of interest, traversing an original path of the directed graph between the target node and the first downstream node of interest, including traversing one or more data transformation nodes or data nodes that are not designated as being of interest.

36. The software of claim 35 wherein traversing the second portion of the path further includes traversing a link corresponding to a summary object associated with the first downstream node of interest from the first downstream node of interest to a second downstream node of interest.

37. The software of claim 29 wherein the one or more summary objects includes two or more summary objects, generating the linage diagram further includes merging at least some of the two or more summary objects into a summary node represented by the common icon.

38. The software of claim 37 wherein merging at least some of the two or more summary objects into the summary node includes analyzing relationships between the nodes of interest linked by the at least some of the two or more summary objects to determine whether merging the at least some of the two or more summary objects is possible.

39. The software of claim 38 wherein analyzing relationships between the nodes of interest includes determining that the at least some of the two or more summary objects are associated with a common downstream node of interest.

40. The software of claim 29 wherein the computing system includes a plurality of separate, interconnected sub-systems, the portions of the directed graph being distributed among at least some of the sub-systems.

41. The software of claim 40 wherein at least some of the sub-systems are represented by the common icon.

42. The software of claim 28 wherein traversing nodes along the paths over directed links in the directed graph and determining one or more of the nodes of the directed graph to exclude from the data lineage diagram includes:
determining an association between a first node and at least a first tag identifier of the plurality of tag identifiers, and determining a first subset of at least one and fewer than all of a plurality of possible tag values for the first tag identifier; and
traversing nodes along a first lineage path of directed links from the first node to determine a data lineage for the first node, where the data lineage includes one or both of (1) a dependency lineage that consists of a unidirectional upstream lineage path of directed links upstream of the first node, and (2) an impact lineage that consists of a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

43. The software of claim 42 wherein determining the data lineage includes, for each traversed node:
adding the traversed node to the data lineage if the traversed node is not associated with the first tag identifier, or the traversed node is associated with the first tag identifier and is associated with at least one tag value of the first subset; or
excluding the traversed node from the data lineage if the traversed node is associated with the first tag identifier and is not associated with at least one tag value of the first subset.

44. The software of claim 43 further including instructions for causing a computing system to, upon excluding a traversed node from the data lineage, terminate traversing of the first lineage path.

45. The software of claim 42 further including instructions for causing a computing system to analyze the plurality of nodes, prior to traversing the nodes of the plurality of nodes, to determine a first subset of the plurality of nodes that are associated with the first tag identifier and are not associated with at least one tag value of the first subset of the plurality of possible tag values for the first tag identifier.

46. The software of claim 45 wherein determining whether to add the traversed node to the data lineage or to exclude the traversed node from the data lineage includes determining whether the traversed node is included in the first subset of the plurality of nodes.

47. The software of claim 46 wherein determining whether to add the traversed node to the data lineage includes adding the traversed node to the data lineage if the traversed node is not included in the first subset of the plurality of nodes and excluding the traversed node from the data lineage if the traversed node is included in the first subset of the plurality of nodes.

48. A computing system for managing lineage information in a computing system, the computing system including:
an input device or port for receiving an identification of a directed graph that includes one or more data nodes that represent data elements, and includes directed links between data nodes that represent respective lineage relationships between data elements that are received and produced, respectively, by a computation during execution of the computation, or directed links between data nodes and data transformation nodes that represent computations that transform data elements, where the directed links between data nodes and data transformation nodes represent respective lineage relationships between a computation and a data element to be received or produced by the computation during execution of the computation; and
at least one processor for computing display information based on paths over directed links in the directed graph and hierarchical container relationships among nodes in the directed graph, and using the display information to generate a data lineage diagram as a visual representation of at least portions of the directed graph, the computing including:
traversing nodes along the paths over directed links in the directed graph and determining one or more of the nodes of the directed graph to exclude from the data lineage diagram based at least in part on any tag identifiers or tag values associated with traversed nodes, where at least one of the traversed nodes is associated with one or more tag identifiers of a plurality of tag identifiers, and at least one tag identifier of the plurality of tag identifiers has a plurality of possible tag values;
receiving designation of interest for a plurality of the nodes of the directed graph;
generating one or more summary objects included in the display information for one or more remaining nodes not included in the plurality of nodes of interest and not excluded based on the traversing, a first summary object of the one or more summary objects including summary information based on a first path over directed links in the directed graph between a first node of interest and a second node of interest; and
generating one or more container objects included in the display information according to the hierarchical container relationships among the nodes, where each container object is able to be represented both by both a collapsed visual representation in the data lineage diagram, and an expanded visual representation in the data lineage diagram that contains visual representations of at least one of: (1) one or more data transformation nodes or data nodes, (2) one or more summary objects, or (3) one or more container objects;
wherein generating the first summary object includes traversing the first path between the first node of interest and the second node of interest to identify one or more remaining nodes that are not designated as being of interest along the first path, and forming the summary information for the identified one or more remaining nodes.

49. The computing system of claim 48 further including instructions for causing a computing system to generate a data lineage diagram as a visual representation of at least portions of the directed graph, in which each node designated as being of interest is represented by its own icon, and a plurality of the remaining nodes are represented by a common icon connected to a plurality of nodes of interest according to summary information stored in one or more of the summary objects.

50. The computing system of claim 49 further including instructions for causing a computing system to receive a user input indicative of a user's desire to view details associated with the common icon and, in response to the user input, traverse the plurality of remaining nodes represented by the common icon and visually representing the remaining nodes in the data lineage diagram based on the traversal of paths of the directed graph including the plurality of remaining nodes associated with the summary information.

51. The computing system of claim 49 further including instructions for causing a computing system to
receive a designation of one of the data transformation nodes or one of the data nodes as a target node,
wherein generating the data lineage diagram includes traversing one or more paths through the directed graph, each path of the one or more paths including two or more nodes of interest and the target node.

52. The computing system of claim 51 wherein for at least some of the one or more paths through the directed graph, traversing the path includes traversing a first portion of the path in an upstream direction from the target node and traversing a second portion of the path in a downstream direction from the target node.

53. The computing system of claim 52 wherein traversing the first portion of the path includes determining whether the target node is marked as being a node of interest, and
if the target node is determined to be a node of interest, traversing a link corresponding to a summary object associated with the target node from the target node to a first upstream node of interest, otherwise
if the target node is not determined to be a node of interest, traversing an original path of the directed graph between the target node and the first upstream node of interest, including traversing one or more data transformation nodes or data nodes that are not designated as being of interest.

54. The computing system of claim 53 wherein traversing the first portion of the path further includes traversing a link corresponding to a summary object associated with the first upstream node of interest from the first upstream node of interest to a second upstream node of interest.

55. The computing system of claim 52 wherein traversing the second portion of the path includes determining whether the target node is marked as being a node of interest, and
if the target node is determined to be a node of interest, traversing a link corresponding to a summary object associated with the target node from the target node to a first downstream node of interest, otherwise
if the target node is not determined to be a node of interest, traversing an original path of the directed graph between the target node and the first downstream node of interest, including traversing one or more data transformation nodes or data nodes that are not designated as being of interest.

56. The computing system of claim 55 wherein traversing the second portion of the path further includes traversing a link corresponding to a summary object associated with the first downstream node of interest from the first downstream node of interest to a second downstream node of interest.

57. The computing system of claim 49 wherein the one or more summary objects includes two or more summary objects, generating the linage diagram further includes merging at least some of the two or more summary objects into a summary node represented by the common icon.

58. The computing system of claim 57 wherein merging at least some of the two or more summary objects into the summary node includes analyzing relationships between the nodes of interest linked by the at least some of the two or more summary objects to determine whether merging the at least some of the two or more summary objects is possible.

59. The computing system of claim 58 wherein analyzing relationships between the nodes of interest includes determining that the at least some of the two or more summary objects are associated with a common downstream node of interest.

60. The computing system of claim 49 wherein the computing system includes a plurality of separate, interconnected sub-systems, the portions of the directed graph being distributed among at least some of the sub-systems.

61. The computing system of claim 60 wherein at least some of the sub-systems are represented by the common icon.

62. The computing system of claim 48 wherein traversing nodes along the paths over directed links in the directed graph and determining one or more of the nodes of the directed graph to exclude from the data lineage diagram includes:
  determining an association between a first node and at least a first tag identifier of the plurality of tag identifiers, and determining a first subset of at least one and fewer than all of a plurality of possible tag values for the first tag identifier; and
  traversing nodes along a first lineage path of directed links from the first node to determine a data lineage for the first node, where the data lineage includes one or both of (1) a dependency lineage that consists of a unidirectional upstream lineage path of directed links upstream of the first node, and (2) an impact lineage that consists of a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

63. The computing system of claim 62 wherein determining the data lineage includes, for each traversed node:
  adding the traversed node to the data lineage if the traversed node is not associated with the first tag identifier, or the traversed node is associated with the first tag identifier and is associated with at least one tag value of the first subset; or
  excluding the traversed node from the data lineage if the traversed node is associated with the first tag identifier and is not associated with at least one tag value of the first subset.

64. The computing system of claim 63 further including instructions for causing a computing system to, upon excluding a traversed node from the data lineage, terminate traversing of the first lineage path.

65. The computing system of claim 62 further including instructions for causing a computing system to analyze the plurality of nodes, prior to traversing the nodes of the plurality of nodes, to determine a first subset of the plurality of nodes that are associated with the first tag identifier and are not associated with at least one tag value of the first subset of the plurality of possible tag values for the first tag identifier.

66. The computing system of claim 65 wherein determining whether to add the traversed node to the data lineage or to exclude the traversed node from the data lineage includes determining whether the traversed node is included in the first subset of the plurality of nodes.

67. The computing system of claim 66 wherein determining whether to add the traversed node to the data lineage includes adding the traversed node to the data lineage if the traversed node is not included in the first subset of the plurality of nodes and excluding the traversed node from the data lineage if the traversed node is included in the first subset of the plurality of nodes.

68. A computing system for managing lineage information in a computing system, the computing system including:
  means for receiving an identification of a directed graph that includes one or more data nodes that represent data elements, and includes directed links between data nodes that represent respective lineage relationships between data elements that are received and produced, respectively, by a computation during execution of the computation, or directed links between data nodes and data transformation nodes that represent computations that transform data elements, where the directed links between data nodes and data transformation nodes represent respective lineage relationships between a computation and a data element to be received or produced by the computation during execution of the computation; and
  means for computing, using at least one processor, display information based on paths over directed links in the directed graph and hierarchical container relationships among nodes in the directed graph, and using the display information to generate a data lineage diagram as a visual representation of at least portions of the directed graph, the computing including:
    traversing nodes along the paths over directed links in the directed graph and determining one or more of the nodes of the directed graph to exclude from the data lineage diagram based at least in part on any tag identifiers or tag values associated with traversed nodes, where at least one of the traversed nodes is associated with one or more tag identifiers of a plurality of tag identifiers, and at least one tag identifier of the plurality of tag identifiers has a plurality of possible tag values;
    receiving designation of interest for a plurality of the nodes of the directed graph;
    generating one or more summary objects included in the display information for one or more remaining nodes not included in the plurality of nodes of interest and not excluded based on the traversing, a first summary object of the one or more summary objects including summary information based on a first path over directed links in the directed graph between a first node of interest and a second node of interest; and
    generating one or more container objects included in the display information according to the hierarchical container relationships among the nodes, where each container object is able to be represented both by both a collapsed visual representation in the data lineage diagram, and an expanded visual representation in the data lineage diagram that contains visual representations of at least one of: (1) one or more data transformation nodes or data nodes, (2) one or more summary objects, or (3) one or more container objects;

wherein generating the first summary object includes traversing the first path between the first node of interest and the second node of interest to identify one or more remaining nodes that are not designated as being of interest along the first path, and forming the summary information for the identified one or more remaining nodes.

* * * * *